T. G. PLANT.
HEELING MACHINE.
APPLICATION FILED FEB. 7, 1908. RENEWED NOV. 22, 1909.

958,292.

Patented May 17, 1910.

9 SHEETS—SHEET 1.

WITNESSES:
INVENTOR:
THOMAS G. PLANT,
BY Robt. P. Haines
ATTY

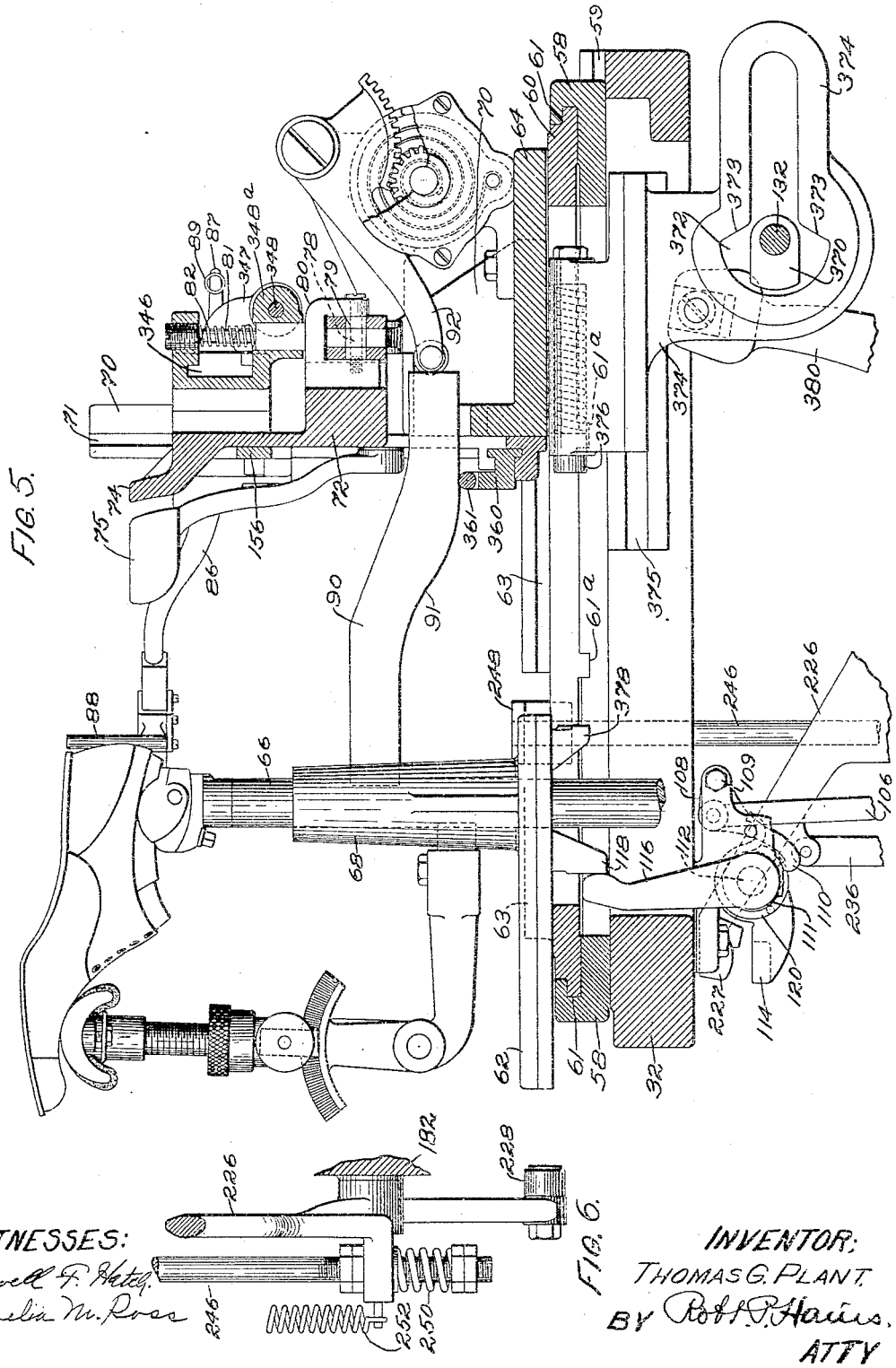

T. G. PLANT.
HEELING MACHINE.
APPLICATION FILED FEB. 7, 1908. RENEWED NOV. 22, 1909.
958,292.
Patented May 17, 1910.
9 SHEETS—SHEET 6.
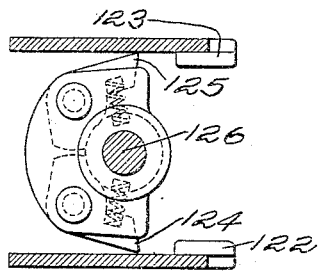
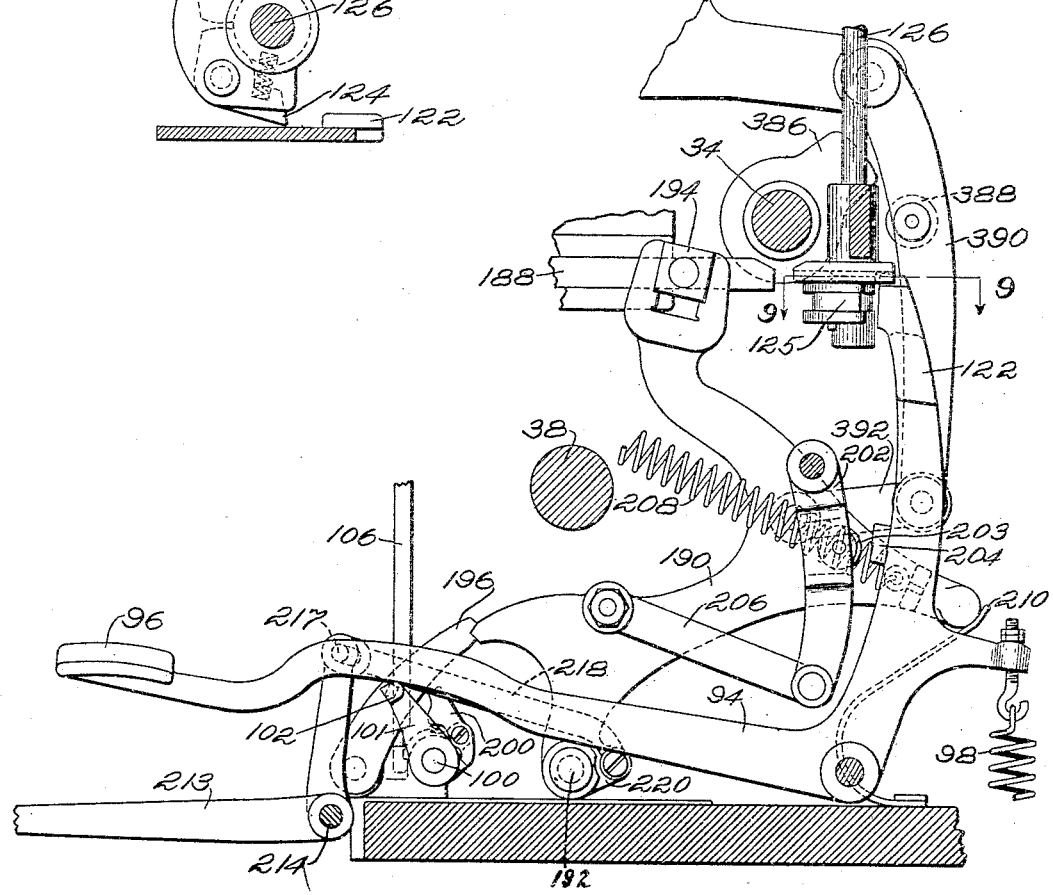
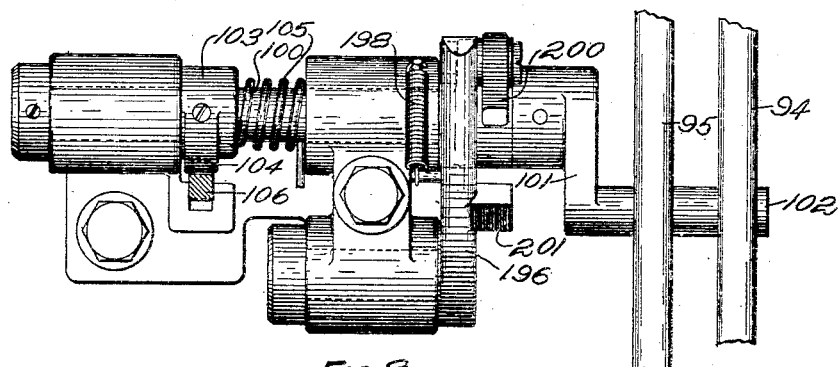
WITNESSES:
Roswell F. Hatch
Amelia M. Ross
INVENTOR:
THOMAS G. PLANT,
BY Robt. P. Harris
ATTY.

T. G. PLANT.
HEELING MACHINE.
APPLICATION FILED FEB. 7, 1908. RENEWED NOV. 22, 1909.
958,292.
Patented May 17, 1910.
9 SHEETS—SHEET 7.
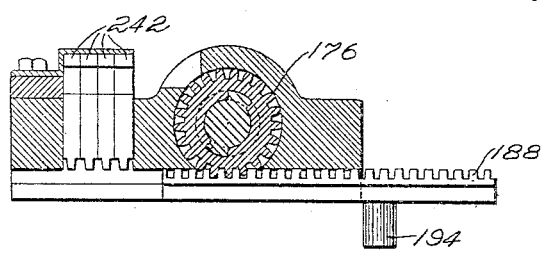
FIG. 11.
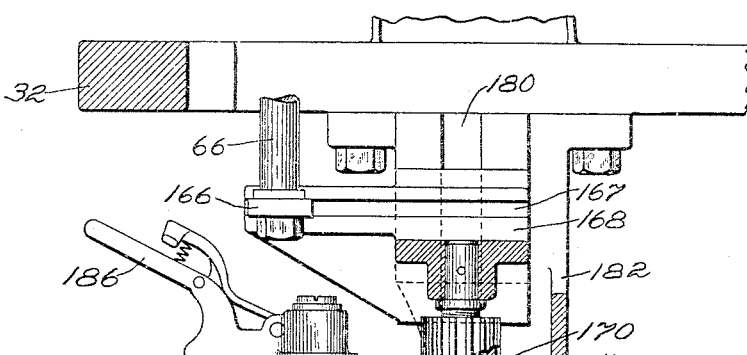
FIG. 10.
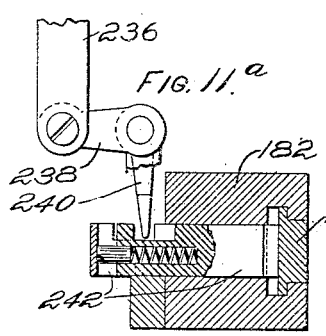
FIG. 11.ª
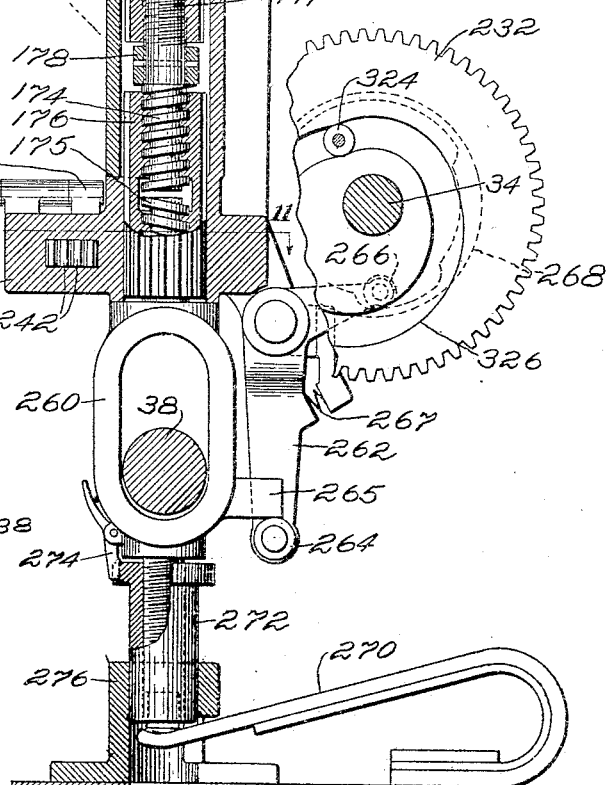
WITNESSES:
Powell F. Hatch
Amelia M. Ross
INVENTOR:
THOMAS G. PLANT,
BY Rob't F. Hains ATTY.

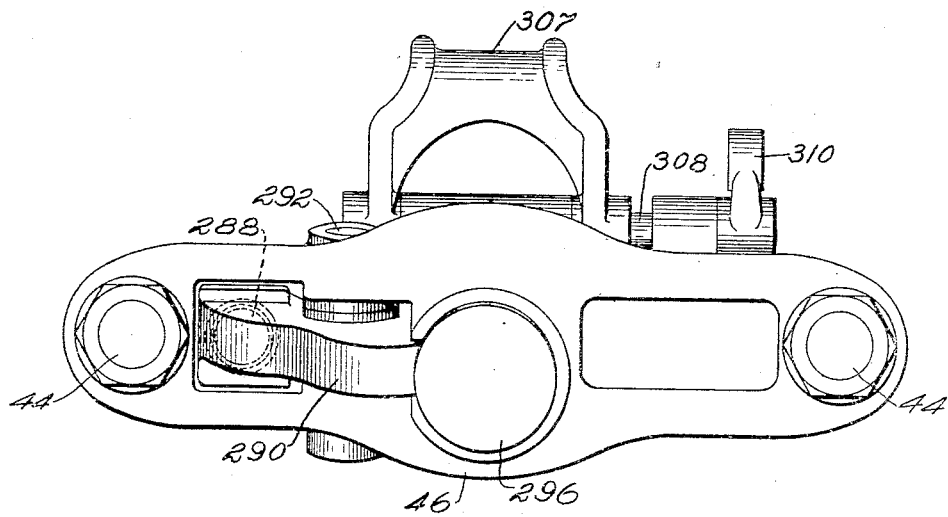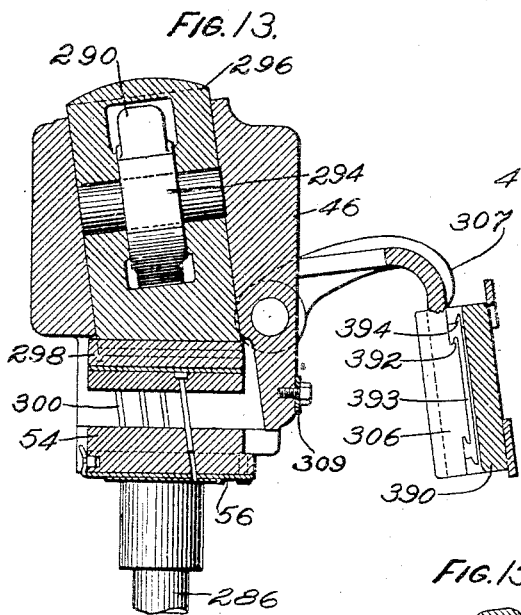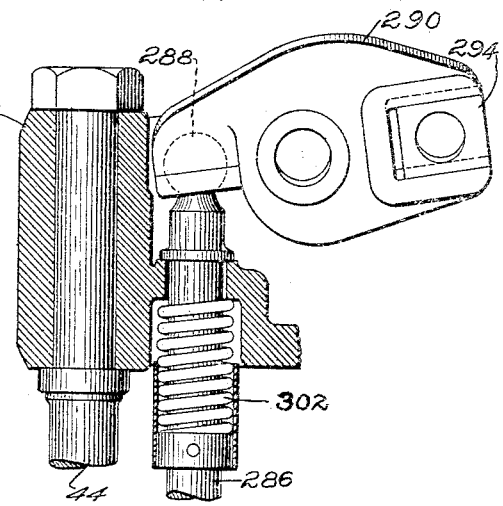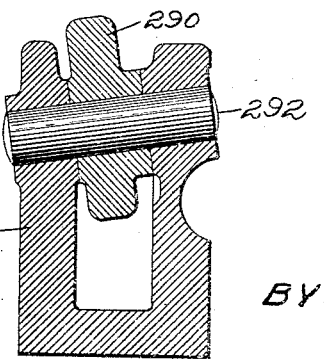

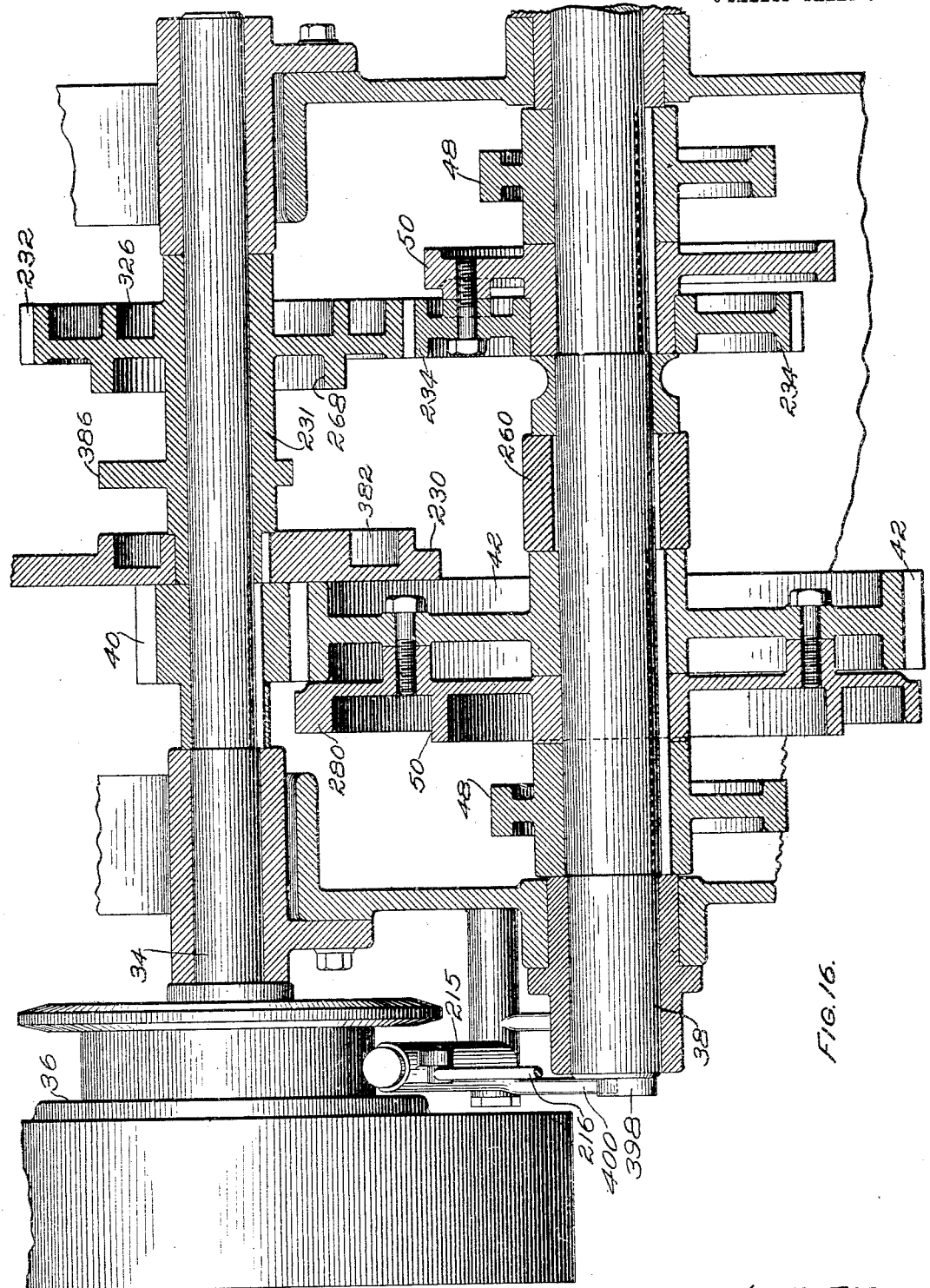

UNITED STATES PATENT OFFICE.

THOMAS G. PLANT, OF BOSTON, MASSACHUSETTS.

HEELING-MACHINE.

958,292.  Specification of Letters Patent.  Patented May 17, 1910.

Application filed February 7, 1908, Serial No. 414,707.  Renewed November 22, 1909.  Serial No. 529,300.

*To all whom it may concern:*

Be it known that I, THOMAS G. PLANT, a citizen of the United States, residing at Boston, in the county of Suffolk and State of Massachusetts, have invented an Improvement in Heeling-Machines, of which the following description, in connection with the accompanying drawings, is a specification, like characters on the drawings representing like parts.

This invention relates to heeling machines, and more particularly to machines for attaching loaded heels to shoes and thereafter blind nailing on a top-lift.

The invention comprehends a machine adapted to operate upon shoes either before or after the last has been removed.

One of the objects of the invention is to so improve the construction of machines of the class described that the heels and top-lifts may be more accurately positioned upon the heel-seat of the shoe.

Other objects of the invention are to increase the rapidity of action and in general to render such machines more effective for the class of work to be done.

To the accomplishment of these objects and such others as may hereinafter appear, as will be readily understood by those skilled in the art, the invention comprises the general features and combinations of parts hereinafter described, and more particularly defined in the appended claims.

Figure 1:
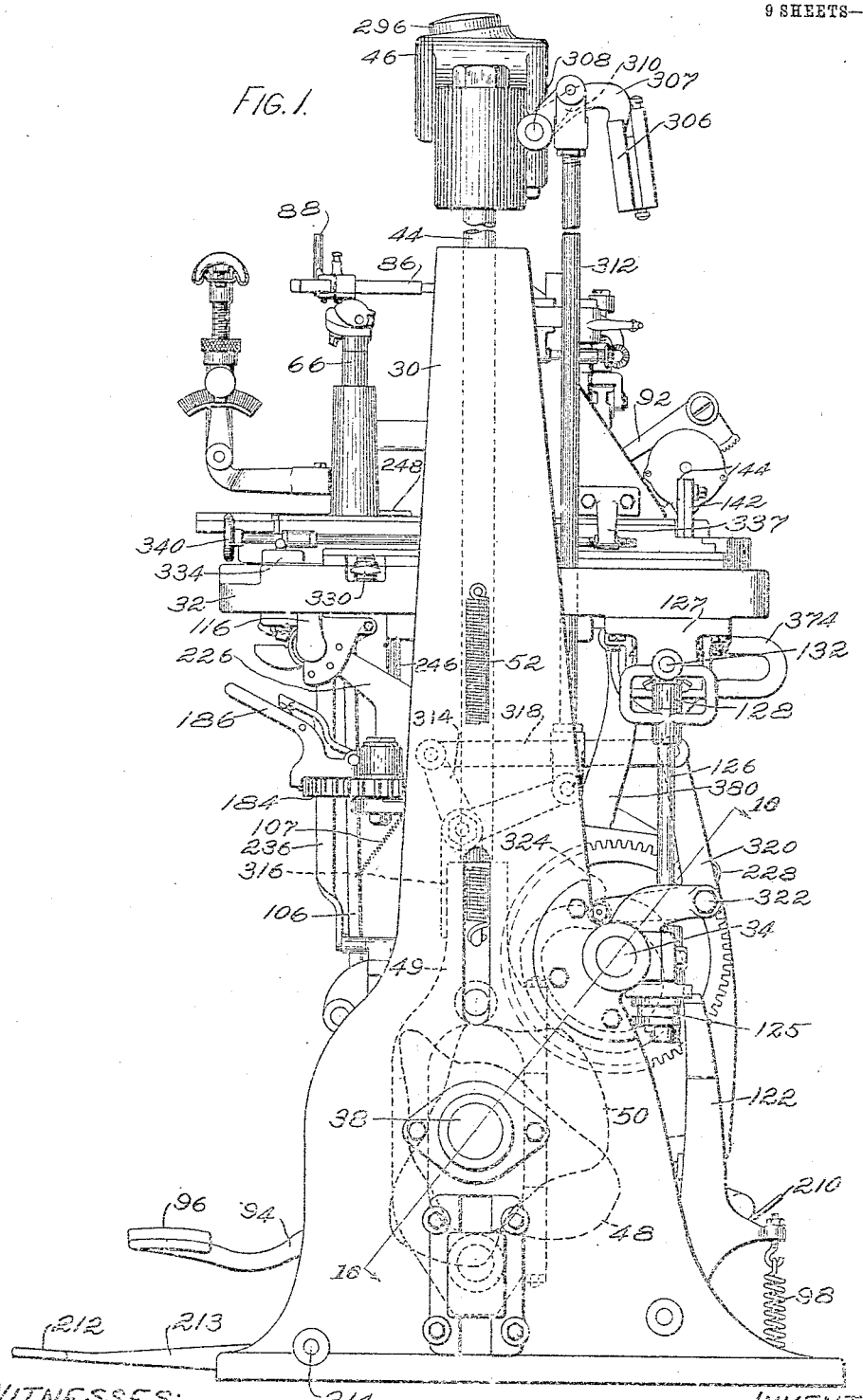
Figure 2:
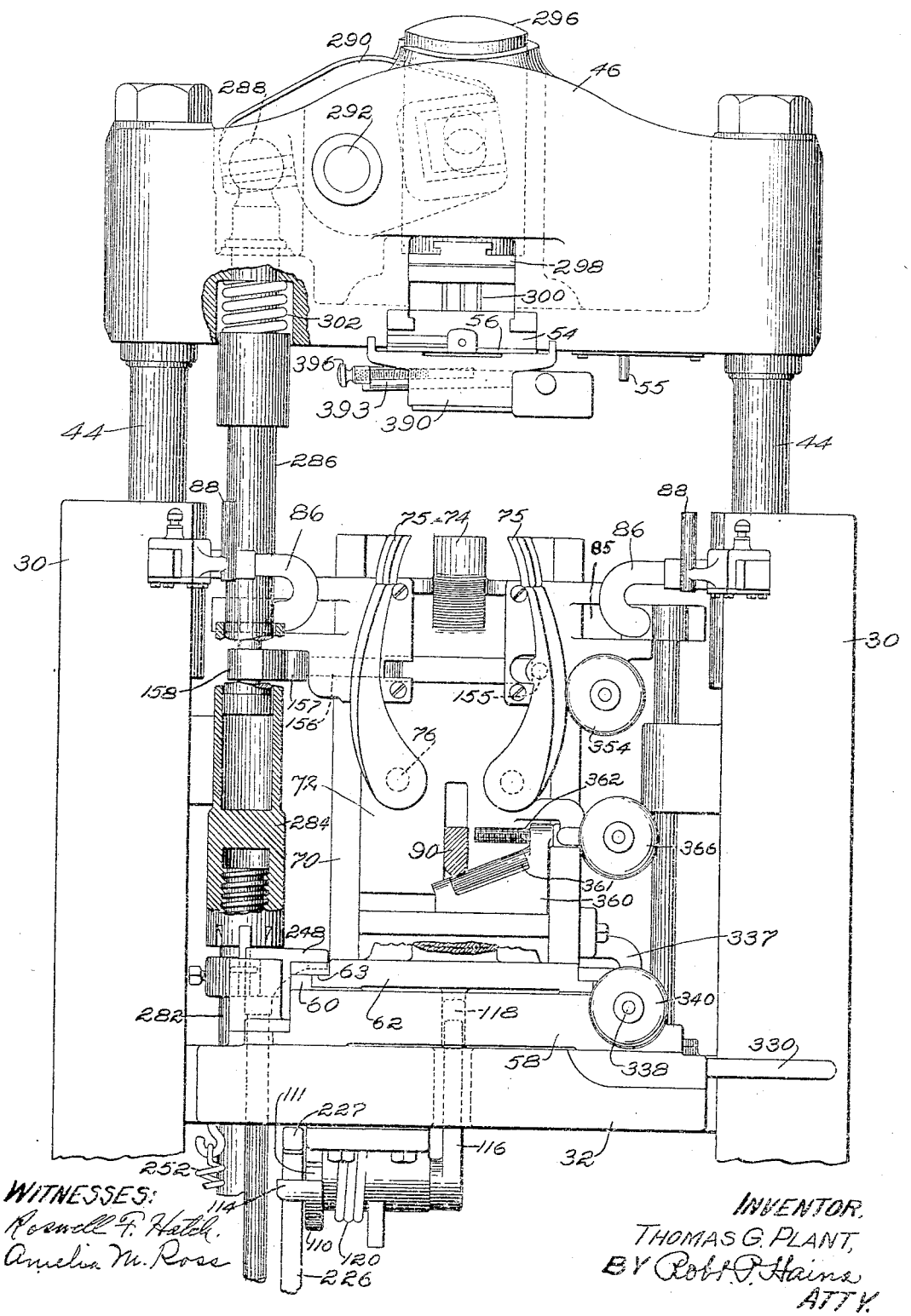
Figure 3:
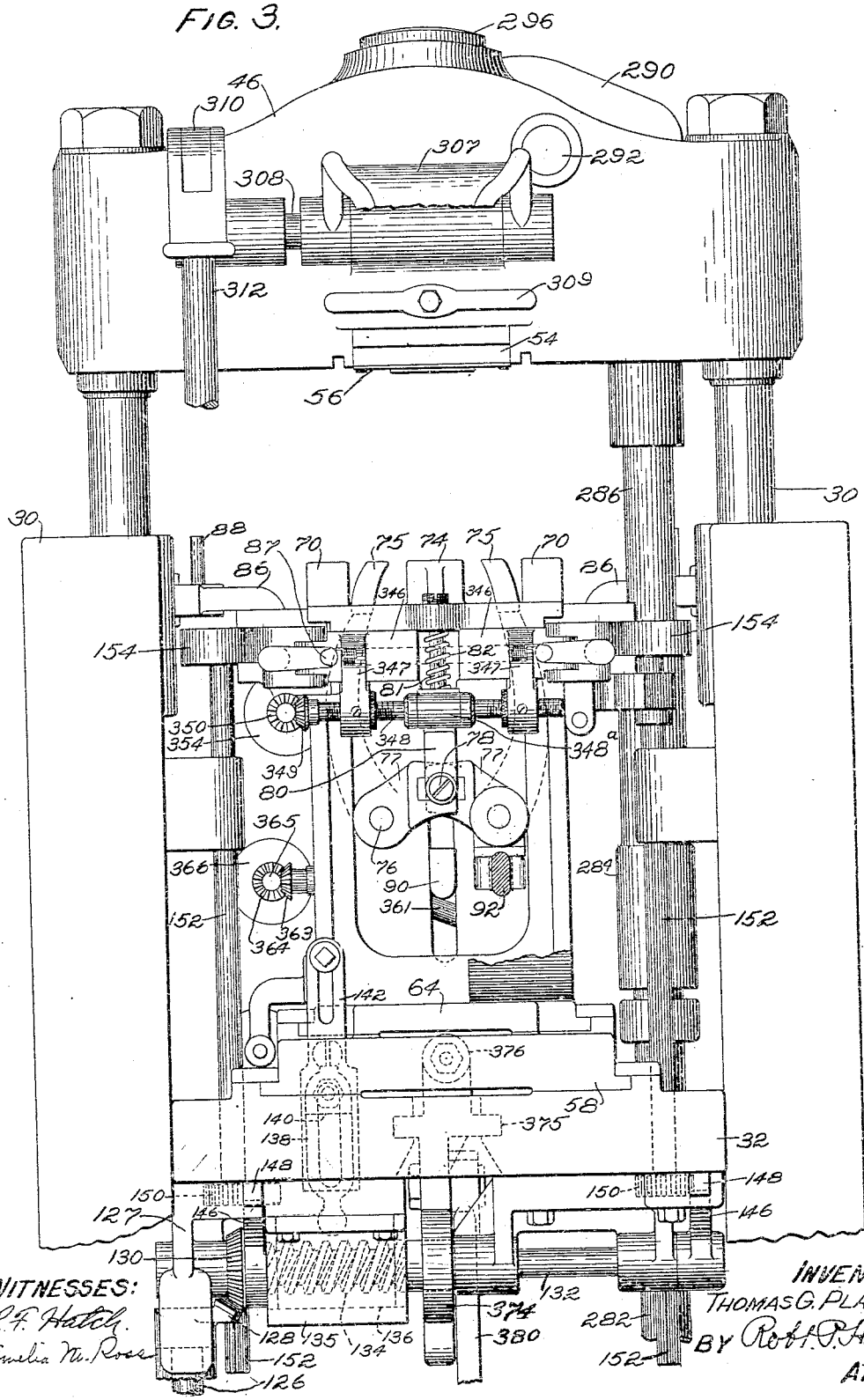
Figure 4:
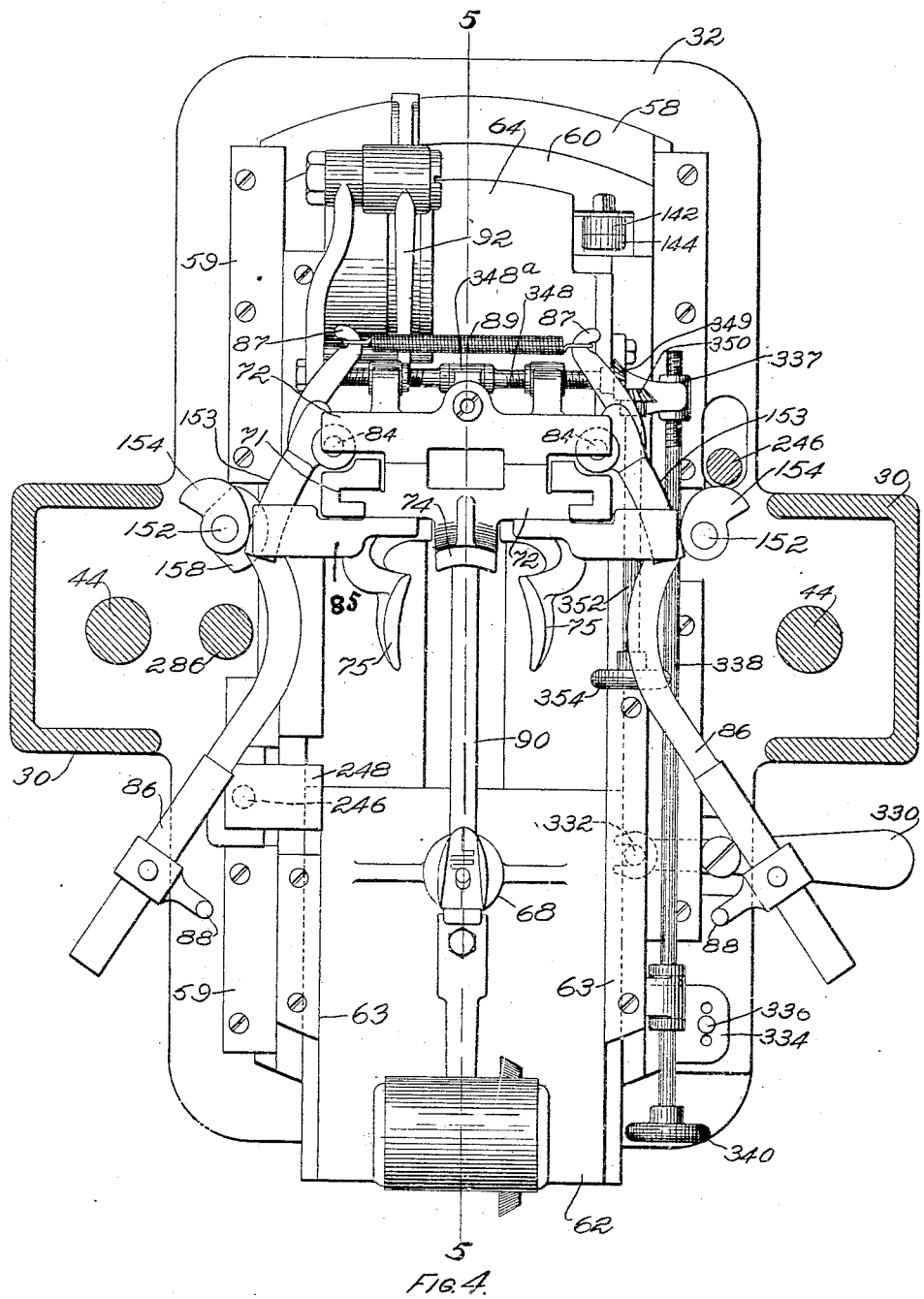

The various features of the invention will be best understood from a description of one embodiment of the invention, such, for instance, as is shown in the accompanying drawings, in which:

Figure 1 is an elevation of the right hand side of the machine. Fig. 2 is a front elevation of the upper portion of the machine with the shoe holding jack and its supporting slide removed, and with certain parts broken away to show details of construction. Fig. 3 is a rear elevation of the portion of the machine shown in Fig. 2. Fig. 4 is a plan of the upper part of the machine with the cross-head removed. Fig. 5 is a vertical longitudinal section on the line 5—5 of Fig. 4, showing the jack in shoe removing and receiving position. Fig. 6 is a detail to be hereinafter referred to. Fig. 7 is a detail in elevation of the operating levers at the lower portion of the machine frame. Fig. 8 is a detail in plan of a portion of the parts shown in Fig. 7. Fig. 9 is a detail in horizontal section on the line 9—9 of Fig. 7. Fig. 10 is an elevation partly in section of the heel measuring mechanism. Fig. 11 is a detail in horizontal section on the line 11—11 of Fig. 10. Fig. 11$^a$ is a detail of the measuring mechanism. Figs. 12 to 15 are details of the nail driver actuating mechanism. Fig. 16 is a sectional view of the line 16—16 of Fig. 1 looking in the direction of the arrows and illustrating the various connections between the main driving shafts and the counter shafts and the actuating cams mounted on said shafts, with all levers driven by said cams removed.

In the embodiment of the invention selected for illustrative purposes and referring more particularly to Figs. 1, 2 and 16 the machine frame is provided with two vertically arranged parallel uprights 30, which rise from a suitable base and have extending between them at a convenient height a tie plate or support 32. Extending between the uprights and transversely of the machine is a driving shaft 34 suitably journaled in the frame and upon which is mounted any convenient form of one revolution clutch indicated at 36 (Fig. 16), which preferably is of the well known "Horton" type. Extending also transversely of the machine between the uprights 30 and journaled in the frame is a counter shaft 38 which preferably is driven only one-fourth as fast as the driving shaft 34 for reasons hereinafter made clear. To gain this end the two shafts are connected by suitably proportioned gears 40 and 42 (Fig. 16) keyed to the shafts 34 and 38 respectively. The uprights 30 serve as guides for plungers 44, 44 which support a cross-head 46. This cross-head is reciprocated vertically by means of cams 48 and 50 (see dotted line Fig. 1) upon the counter shaft 38 which is placed directly beneath the cross-head. The connection between each of the plungers and its cams is made in any convenient manner as by means of a yoke 49 (dotted lines Fig. 1) extending about the counter shaft and carrying suitably arranged rollers above and below the cams for contact therewith. Suitably connected springs 52 (Fig. 1) may also be provided to assist in supporting the weight of the cross-head and its associated parts. Preferably the cams 48 and 50 are so designed that two complete reciprocations are given to the cross-head for each complete revolution of the counter shaft 38. One reciprocation of the cross-head being used for nailing on a heel and the second reciprocation being used for spanking a top-lift on to the previously attached heel. The cross-head 46 is preferably provided with a removable nail block 54 held in place in the usual manner by a latch having a finger piece 55 (Fig. 2) projecting from the cross-head. This nail block is preferably of the multiple type having a sufficient number of conveniently arranged nail holes for nailing any desired size or style of heel although obviously the same objects may be otherwise secured. In connection with the nail block 54 there is used one of a series of templets 56 (Figs. 2, 3, and 13) which is removably secured to the nail block and so constructed that only the desired series of holes in the nail block for the particular heel being attached remain uncovered. The templet 56 is somewhat below the operator's line of vision and therefore the holes therein are preferably countersunk to some extent so that he may with ease find them by sense of touch with the projecting nails from a loaded heel. Above the nail block is a driver block 298 (Fig. 2) also removable from the cross-head 46 and having mounted therein a gang of drivers 300, one for each hole in the nail block 54. In the operation of the machine, as hereinafter described, the drivers are moved downwardly into the nail block, through a stroke sufficient to bring their lower ends substantially flush with the lower face of the nail block and therefore flush with the upper face of templet 56. As the face of the heel is supported firmly against the templet, during the driving operation, the nails projecting from the loaded heel, which have been inserted in the holes in the nail block, are so driven into the heel as to leave their heads projecting a short distance, equal substantially to the thickness of the templet. These projecting nail heads are used in securing a top lift on the heel. In the further operation of the machine a top-lift carrier 306 (Fig. 1) is brought to a position beneath the nail block and places the top-lift carried thereby in proper relation to the horseshoe of nail holes in the templet in readiness to be spanked on to the heel on the next downward movement of the cross-head 46.

The support 32 of the machine frame sustains the shoe jack and also the devices for clamping the shoe with relation to the driving devices operating in the cross-head 46. The preferable mounting of these parts will now be described.

Referring first to Fig. 5, upon the support 32 there is mounted a table 58 having movement forward and backward in suitable guide ways 59, upon said support. On this table 58 there is mounted a second table 60 having angular movement, in suitable guides 61 and a turning circle 61ª, transversely of the machine. On this table 60 there is mounted a slide 62 supporting the jack and a second slide 64 supporting the clamping and positioning devices for the shoe. The slides 62 and 64 have forward and backward movement in guideways 63 on the table 60. The guideways for the table 58 may be seen best in Fig. 4, together with the curved guideways for the ends of the table 60. The guideways for the slides 62 and 64 may be seen most readily in Figs. 2 and 5. Referring still to Fig. 5 there is shown a jack comprising heel and toe supports provided with the various desirable adjustments, which parts may be of any suitable and convenient construction for performing the desired offices. This jack as a whole is mounted upon a spindle 66 which has vertical movement within a guiding sleeve 68 rising from the jack slide 62. A shoe with the last still within the upper is mounted, sole up, on this jack preparatory to any movement of the machine parts. Rising from the slide 64 (Fig. 5) is a frame 70 provided with vertical guideways 71 in which is mounted a slide 72, which sustains a shoe back stop 74 and counter clamps 75, 75 (Fig. 4). The counter clamps 75 are at the upper ends of lever arms which are fulcrumed by their lower ends upon horizontally arranged pins 76 (Figs. 2 and 3). Secured to and extending inwardly from each of these pins is a short lever arm 77 (Fig. 3) which lever arms are provided at their inner ends with yokes which cross each other and carry between their arms a pin 78 (Fig. 5) on which is a block 79 for each yoke. Attached to the pin 78 is a slide block 80 having a stem 81 and normally pressed downward by means of a coiled spring 82 surrounding the stem and extending between the lug on the slide 72 and a shoulder on the block 80. The construction is such that the spring 82 tends constantly to force the inner ends of the lever arms 77 downwardly and therefore turn the counter clamps 75 inwardly into clamping position upon the shoe. The force of the spring 82 is overcome and the counter clamps held normally apart, in open position, by means hereinafter to be described. The construction of the parts is such that wear occurs only at the under side of the blocks 79 and therefore the wear is constantly taken up by the spring 82 and the effective grip of the counter clamps 75 is increased rather than diminished. After a shoe has been jacked and has been clamped in the machine by means of the counter clamps, as is usual, it is in some position beneath the nail block and driving devices and the operator must determine by his eye or by several trials of the machine whether or not it is in correct alinement with such devices and whether or not the heel is correctly pointed relatively thereto. The swinging table 60 is used to turn the shoe angularly in order that it may be in proper position beneath the heel to have the heel point in the desired direction when attached. Heretofore, in angularly adjusting a shoe with relation to the heel by swinging a table on which the shoe jack is mounted, the limit of swing has been determined by adjustable stops on the table. As is well known to those skilled in the art counter clamps do not hold all shoes of one kind invariably in the same position as there is considerable opportunity for loose play of the shoe between the clamps. Therefore a swinging table alone is unreliable to determine a similar pointing of the heel on a series of shoes, as the heel will be pointed according to the position assumed by the shoe within the counter clamps. It is therefore desirable that some means be provided, to aid the angular adjustment of a shoe by means of a swinging table, so that each shoe of the same kind invariably reaches the same angular position with relation to the heel before the heel is attached.

Referring now to Figs. 3, 4 and 5, mounted upon vertical pivots 84 (Fig. 4) at either side of the vertically moving slide 72 are horizontally arranged arms 86, 86 carrying upon their forward ends adjustable gages 88, 88. The arms 86 have horizontal movement in guides 85 in the slide 72. The gages 88 may be termed fore-part gages. The rear ends 87 of the arms 86 are connected together by a spring 89 (Fig. 4) which normally maintains the gages 88 at the outer ends of their path of movement. When a right shoe is being operated upon the left gage 88 (viewing Fig. 2) is brought to a position so that in moving the shoe angularly by swinging the table 60 to properly point the heel the operator has a stop against which the inner edge of the sole of the shoe may be brought, thereby correctly determining the position that the shoe should assume in the counter clamps 75. When operating upon a left shoe the right fore part gage 88 will be brought forward for a similar purpose.

Before a shoe is jacked the jack is preferably in position at the front of the machine for convenient handling of the shoe and must be moved backward into the machine to gain its heel attaching position between the counter clamps. Preferably some means is provided for starting this movement. It is not desirable to move the jack backwardly into the machine automatically, as this can be more conveniently done by the operator himself, but it is convenient to impart an actuating movement to the jack so that the operator who, after jacking the shoe naturally places a hand upon the support 68, may know at what time to exert force to move the jack backward.

Referring now to Figs. 7 and 8 two large bell crank levers 94, 95, arranged side by side are fulcrumed in the lower portion of the machine frame preferably at the right. Each of these levers carries at its forward end a treadle 96 which treadles are normally held raised by means of suitably connected coiled springs 98. A short rock shaft 100 extends transversely of the lower part of the machine frame and is provided with a crank 101 having a pin 102 arranged beneath the levers 94 and 95. The rock shaft is also provided with a collar 103 having formed upon it a projecting lug 104 adapted to engage against a shoulder in the lower end of a rod 106. A coil spring 105 (Fig. 8) is arranged to keep the pin 102 and the lug 104 normally raised. The rod 106 extends upwardly and is connected to a rock arm 108 (Fig. 5) fulcrumed upon a pin 109 mounted in a bracket upon the under side of the support 32. The rock arm 108 is provided with a hooked end forming a latch 110 adapted to engage a projecting shoulder upon the periphery of a collar 111 upon a rock shaft 112 also sustained in the bracket upon the under side of the support 32. The collar 111 has upon it a crank arm 114 for a purpose to be hereinafter described. The rock shaft has also upon it a crank arm 116 which projects upwardly into position for its end to engage a lug 118 extending downwardly from the under side of the slide 62 which supports the jack. A coiled spring 120 surrounds the rock shaft 112 and is so connected as to normally tend to rotate the shaft in a direction to turn the arm 116 toward the rear of the machine, thereby moving the jack slide 62 backwardly. The latch on the crank arm 108 normally maintains the spring 120 under tension with the arm 116 in its forward position. If now either of the treadles 96, upon the levers 94 and 95, are depressed the crank pin is forced downwardly. This rotates the rock shaft 100 in a direction to cause the lug 104 to bear downwardly upon the rod 106 which moves the rock arm 108 in a direction to release the latch 110 from engagement with the sleeve upon the rock shaft 112, said lug 104 then freeing the rod 106 so that the latch 110 may be moved to again latch the arm 116 when the arm 114 is again actuated. This allows the coiled spring 120 to operate to move the arm 116 backwardly, thereby carrying with it the slide 62 and the jack. The force exerted by the spring 120 is preferably insufficient to carry the shoe between the counter clamps, such movement being completed by the operator.

The initial backward movement of the jack just described should occur previously to the time that the shoe is angularly adjusted by swinging the table 60 and the proper fore part gage 88 is brought into operative position, and also prior to the closing of the counter clamps upon the shoe, so that the operator may have time to move the jack entirely back into the machine with the counter against the back stop 74 and within the counter clamps 75 before the latter are closed. To this end it is convenient to utilize the bell cranks 94 and 95 to actuate a train of mechanism for moving the shoe angularly, positioning the proper forepart gage, and closing the counter clamps just after the jack slide has been unlatched.

Referring now to Figs. 1, 3, 7, 8 and 9 the bell crank levers 94 and 95 are provided with upwardly projecting arms 122 and 123 respectively, which are constructed to engage spring pressed teeth 124 and 125, mounted preferably as in Fig. 9, upon a vertically arranged rock shaft 126 journaled at its lower end in a bracket upon the machine frame and at its upper end in a bracket 127 depending from the support 32 (see Fig. 1). The upper end of the rock shaft 126 (Fig. 3) carries a segment 128 meshing with a pinion 130 on one end of a transversely arranged rock shaft 132, journaled at the rear of the machine upon the under side of the support 32. The shaft 132 carries upon it a screw 134 of coarse pitch about which is a block 136 (see dotted lines Fig. 3) which is held from rotation upon the screw by being carried in a box 135. Projecting upwardly from the block 136 and seated in said block by means of a universal joint is a slotted lever 138 connected at its upper end, by means of a second universal joint and longitudinally slidable block, to the swinging table 60. A fulcrum block 140 is provided for the lever 138 said fulcrum block being mounted in a bracket 142 attached to the table 58. An arm 144 (Fig. 1) projects upwardly from the fulcrum block 140 which arm is adjustably connected to the bracket 142 so that the fulcrum of the lever 138 may be shifted to vary the amount of swing given the table. It is thus seen that when either of the treadles 96 are depressed after the jack slide 62 has been unlatched one or the other of the teeth 124 and 125 upon the vertical rock shaft 126 will be engaged to rotate said rock shaft, therethrough turning the screw 134 and moving the block 136 surrounding said screw transversely across the machine within limits determined by suitable stops, as shoulders or collars on the rock shaft 132. Such movement of the block 136 will turn the lever 138 about its fulcrum and thereby shift the swinging table 60 about its axis of rotation. If the tooth 124 is engaged by depressing the right treadle 96, the swinging table 60 will be rotated in a direction for angularly positioning a left shoe, while if the tooth 125 is engaged by depressing the left treadle 96, it will be rotated in a direction for angularly positioning a right shoe. Therefore the bell crank lever 94 and its treadle 96 may be termed a left shoe treadle, while the bell crank 95 and its treadle 96 may be termed a right shoe treadle.

As heretofore stated the proper fore part gage 88 should be moved into position at the time that the swinging table 60 is rotated so that it may reach its operative position in time to perform its office. To accomplish this the gages 88 are conveniently operated from the transverse rock shaft 132 which carries the screw 134. Upon this rock shaft are mounted two segments 146 which engage teeth on racks 148, 148 mounted to slide in ways beneath the support 32. The racks 148 are arranged, with relation to pinions 150, 150 held from vertical movement in brackets beneath the support 32, so as to rotate said pinions both in the same direction. The pinions 150, 150 are slidably keyed upon the lower portions of vertical rock shafts 152, 152 on opposite sides of the machine and extending with their upper ends adjacent the outer sides of the fore part gage supporting arms 86 and forward of their pivots 84. The rock shafts 152 carry on their upper ends cams 154, 154, arranged to engage bearing surfaces 153 on the arms 86. These cams are so mounted upon their shafts that when said shafts are turned clockwise (viewing Fig. 4) the forepart gage 88 at the left of the machine, which is the gage for use with a right shoe, is the one brought into operative position, while if the shafts 152 are turned in a counter-clockwise direction the forepart gage 88 at the right of the machine is the one brought into operative position, this being the forepart gage for use with a left shoe.

With such a construction as just described, it is seen that if the screw 134 is turned in a direction to swing the forward end of the table 60 to the left for angularly positioning a right shoe, (viewing Fig. 4) the forepart gage 88 at the left will then be brought into operative position, while if the forward end of the table 60 is swung to the right for angularly positioning a left shoe (viewing Fig. 4) the forepart gage 88 on the right will be brought into operative position. In each case the other forepart gage remains inoperative for the reason that its operating cam 154 is not moving in a direction to become active. The shoe having been angularly positioned for pointing the heel by means of the swinging table 60 and the proper forepart gage 88, it may now be clamped in such position by means of the counter clamps 75. As has been explained, the counter clamps would be normally maintained in their closed position by means of force exerted by the spring 82 if means were not provided for maintaining the clamps open so that a shoe may be placed between them.

Referring to Figs. 2 and 5, one of the counter clamps has projecting from its supporting arm a pin 155 (Fig. 2) bearing against one end of a transversely arranged rod 156 mounted in a suitable guideway on the vertically movable slide 72 and having at its other end a head 157 engaged by a cam 158 (Figs. 2 and 4) upon one of the vertical rock shafts 152. When the machine is at rest and before the swinging table 60 has been rotated, or either of the forepart gages have been brought into operative position, the cam 158 is in such position that the rod 156 has been moved to the right (viewing Fig. 2) and thereby has moved the counter clamp 75 at the right to its outer position and, through its connection with the counter clamp 75 at the left, has moved the latter clamp into its outer position leaving the two clamps open and ready for the insertion of a shoe with the closing spring 82 under tension. As the rock shaft 152 carrying the cam 158 is turned, in positioning either of the forepart gages, the cam 158 is rotated until it finally reaches a position where the rod 156 is released and the spring 82 is permitted to exert its force to move the counter clamps 75 inwardly to clamp the counter of a shoe, the shoe having by this time been moved to the position of desired angular adjustment.

In operating upon shoes in which the wooden last is still retained it is necessary, as is well known by those skilled in the art, to measure the heel in order that the wooden last will not be broken by applying too much pressure. This measuring operation in the illustrative embodiment of the invention, is preferably performed before the automatic operation of the machine in attaching the heel is started. Before the heel is measured however, when operating upon wooden lasts, it is desirable that the heel seat of the shoe be in such position beneath the heel that the heel may be conveniently measured without excessive movement on the part of the measuring mechanism. In practice it is convenient to have the jack spindle 66 at such a height that the heel seat of the shoe is about one inch from the heel. It is desirable that the counter clamps grasp the shoe with their upper edges just below the outsole. Obviously, were the counter clamps maintained always in proper position for receiving the shoe the space between them and the nail block for use of the operator in placing a heel would be cramped. It is desirable, therefore, to normally maintain the counter clamps depressed and not move them into proper vertical relation with the counter of the shoe until after the heel has been placed in the nail block. This end is accomplished, in the illustrative embodiment of the invention, by means of the devices now to be described.

The jack spindle 66 is conveniently provided with a rearward extension 90 (Fig. 5) having on its under side a cam surface 91. This extension projects through an opening in the slide 72, and is so formed as to maintain the slide 72 and counter clamps 75 depressed when the jack is in its forward position. The lower side of said opening is maintained in contact with the cam surface 91 by means of a spring pressed arm 92, mounted on the frame 70 and bearing upwardly against a lug on the slide 72. As the jack slide 62 is moved backwardly into the machine after a heel has been placed in the nail block, the formation of the cam surface 91 permits the spring pressed arm 92 to lift the slide 72, and with it the counter clamps 75, into operative position. The vertical movement of the slide is of course constant but its path of movement may be altered, to suit varying formations of lasts, by adjusting means hereinafter to be described.

Before describing the preferred construction of measuring mechanism it is convenient to describe the various positions in which it may be desirable to place a heel with relation to the shoe and the means used in the illustrative embodiment of the invention for effecting such varying relationship.

When the top-lift carrier 306 is brought into position beneath the nail block the top-lift sustained thereby should be in such position with relation to the heel-seat of the shoe, that when the heel is trimmed by using the top-lift as a guide, as is customary, the desired appearance of the heel with relation to the shoe will be obtained. If a right or left appearance of the heel is not required, it is desirable that when the shoe is viewed from the rear the planes formed by the lateral surface of the heel between the top-lift and the outer sole, upon either side of the shoe, extend at the same angle to the tread face of the top-lift. Such an alinement of the heel will give the shoe the trim appearance desired. It is obvious that this alinement will be obtained if the top-lift be secured to the heel in such position that the center of its back is in vertical alinement with the heel seam which in turn is at the center of the back of the heel seat of the shoe. On the other hand if the center of the back of the top-lift is not centrally arranged with relation to the back of the heel seat of the shoe, when the heel is trimmed with relation to a top-lift so placed, the lateral surface of the heel at one side will extend at a greater angle to the face of the top-lift than the lateral surface at the other side. Assuming that a top-lift has been correctly alined as just described above the heel seat of a shoe which has been placed square with the series of nail holes in the driver block, it is obvious that if such shoe be then adjusted for pointing the heel by turning the shoe angularly about a center somewhere within the perimeter of the top-lift it will throw the center of the back of the heel seat of the shoe to one side or the other of the center of the back of the top-lift, which remains stationary during the angular adjustment. Under these conditions the desired square appearance of the finished heel will not be obtained even though the angular adjustment for pointing has been correctly made. Such a condition may be remedied by placing the pivot on which the shoe is turned, substantially vertically in line with (and in the present embodiment of the invention directly beneath) the center of the back of the top-lift instead of within its perimeter. This point is chosen preferably as all top-lifts, of whatever size, when secured to a heel overlap substantially the same distance beyond the rearmost nail, therefore it will not be necessary to change a center so selected in changing the size of the top-lift. The distance of the center of the back of the top-lift forward of the center of the back of the heel seat is so slight that for all practical purposes a turning center chosen as described will give the same results as if it were in fact in vertical alinement with the center of the back of the heel seat.

In adjusting a shoe, whether right or left, for a desired pointing of the heel, the shoe is swung in the direction of its inner side. Under this condition it is obvious that if the shoe be swung about an axis beyond the center of the back of the stationary top-lift, the center of the back of the heel seat of the shoe will be moved to a position on the inner side with relation to the shoe, of the center of the back of the top-lift. If, however, the shoe be swung, in the direction named, about an axis in front of the center of the back of the stationary top-lift (i. e. within the perimeter of the top-lift) the center of the back of the heel seat of the shoe will be moved to a position on the outer side, with relation to the shoe, of the center of the back of the top-lift. The heel when trimmed will then have a right or left appearance on the shoe according to the position of the axis about which the shoe is swung.

A description will now be given of the preferred means for adjusting the axis upon which the swinging table 60 rotates so that the shoe may be properly positioned beneath the stationary top-lift when the carrier 306 is brought into position beneath the nail block. It is convenient at this time, also to describe the adjustment of the heel clamps and forepart gages. These various parts are best seen, in the illustrative embodiment of the invention, by reference to Figs. 1 to 5.

As heretofore described the swinging table 60 is carried by the table 58 which has movement in and out of the machine and it is upon this table 58 that the table 60 is swingingly mounted. Therefore any movement of the table 58 across the cross head 46 will move the pivotal point of the table 60 relatively to a top-lift held stationarily in position beneath the nail block of the cross head. Before any work is performed upon the machine the table 58 should be adjusted with relation to the cross head in such manner that the pivotal point of the swinging table 60 is in the desired relation to the center of the back of the top-lift when in spanking position. This may be accomplished by means of a hand lever 330 (Figs. 1 and 4) pivoted on the support 32 and engaging at its inner end a pin 332 on the table 58. The table 58 is provided with a lug 334 having a series of three holes through which a pin 336 is adapted to be passed to register any one of the holes with a single hole beneath the series in the support 32. The table 58, when adjusted by the hand lever 330, is thus locked in adjusted position. When the table 58 is adjusted so that the central hole of the series of three registers with the hole therebeneath in the support 32 the axis about which the table 60 swings is in vertical alinement with the center of the back of a top-lift correctly positioned with relation to the horseshoe of nail holes in the templet 56. When the forward or the rear hole is thus in register, the axis named is beyond or forward respectively of the center of the back of the top-lift. Means is thus provided for preliminarily adjusting the axis of the swinging table to give a square, or a right or left appearance to the heel when trimmed.

In operating upon heels of varying pitch the selected position for the axis of the swinging table 60 should remain unaltered, the proper adjustment being obtained by movement of the shoe relatively to the top-lift. Therefore the slide 64 (Fig. 5) which supports the back gage and counter clamps is connected by a threaded lug 337 to a rod 338 (Figs. 1 and 4) having an operating hand wheel 340 and suitably mounted for adjusting the slide 64 forward and backward upon the swinging table 60 with relation to its axis of movement. It is obvious that after the shoe has been jacked, and the jack has been moved backwardly between the counter clamps, and they have closed upon the counter of the shoe, rotation of the rod 338 will not only operate to move the slide 64 in or out but, because of its connection with the shoe through the counter-clamps, will also carry with it the slide 62 supporting the jack. The position of the heel seat of the shoe, with relation to the top-lift, may thus conveniently be adjusted. It will be noted however that in either of the adjustments just referred to the axis of the swinging table 60 with relation to the top-lift remains unchanged, therefore when the swinging table is turned about its axis of rotation, carrying the shoe with it, neither of these adjustments will affect the desired appearance of the heel when trimmed.

It is obvious that with varying sizes of shoes, or varying styles, the position to which it is desired to bring either of the forepart gages 88 will vary. For the smaller sizes, and for narrow shoes, their operative position should be well toward the center while for the larger sizes and great widths their position should be correspondingly farther from the center. Because the throw of the cams 154 (Fig. 4) is constant the length of the movement of the gages 88 will always be constant but by changing the path of their movement their operative position may be readily varied. The path of the movement of the gages 88 is preferably changed by mounting the pivots 84 of their supporting arms 86 in sliding blocks 346 (Figs. 3 and 5) which are connected by depending lugs 347 to right and left threads upon a rotatable rod 348 supported against axial movement in a bracket 348$^a$ on the vertical slide 72. The rod 348 has at one end a bevel gear 349 meshing with a similar bevel gear 350 on an operating rod 352 (Fig. 4) having a hand wheel 354 (Figs. 2 and 4). By turning the hand wheel 354 the rod 348 is rotated in one direction or the other thereby moving the sliding blocks 346 either inwardly or outwardly to alter the position of the pivots 84 of the forepart gage arms 86. The path of movement of the gages 88 is thus altered and therethrough their operative position relative to the machine center line is altered.

It is desirable, when working on wood lasts, that the heel clamps 75 be preliminarily vertically adjusted so that when permitted to be raised by the cam surface 91, on the jack spindle extension 90, their upper edges may be placed just below the out sole, whatever may be the height of the last. To this end means is preferably provided for adjusting the counter clamp carrying slide 72 independently of its movement permitted by the cam surface 91 under force of the spring pressed arm 92. To this end a wedge 360 is preferably provided mounted below the extension 90 in transverse guideways on the vertical slide 72. The wedge preferably has a roller 361 at its upper edge to form an anti-friction bearing for the cam surface 91. A horizontal stud 362 held from axial movement is threaded into a lug on the wedge 360 and carries at its outer end a bevel gear 363 which in turn meshes with a bevel gear 364 on the inner end of a short rod 365 supported on the slide 72 and carrying at its forward end a hand wheel 366 (Fig. 2). Rotation of the rod 365 will turn the screw 362 to move the wedge 360 transversely beneath the extension 90 thereby lowering the slide 72 and with it the counter clamps 75, with relation to the shoe mounted upon the jack, or permitting it with the said counter clamps to be raised by the spring arm 92.

The heel measuring mechanism, used in the illustrative embodiment of the invention, is shown most clearly in Figs. 5, 7, 8, 10 and 11. Referring to these figures, and more particularly to Figs. 5 and 10, the jack spindle 66 is supported upon a block 166 which is carried in horizontally arranged guideways 167 in a head 168 mounted upon the upper end of a measuring spindle. The measuring spindle extends within a frame 182 depending from the support 32 and is preferably formed of two pairs of right and left hand screws each of which pairs are connected by a toothed sleeve in the form of an elongated pinion. Each pair of screws with its connecting sleeve forms a turn buckle. Referring to Fig. 10 the upper pair 170 and 171 of right and left hand screws are connected by a sleeve 172 while the lower pair 174 and 175 of right and left hand screws are connected by a sleeve 176. The screws 171 and 174 are held from rotation by a collar 178 pinned thereto and moving in guides in the frame 182. Thus all the screws combine to form substantially a single spindle, which however, is capable of longitudinal adjustment. The lower screw 175 is fixed to a support hereinafter described. The upper screw 170 is pinned to the head 168 which supports the jack spindle 66. The head 168 is mounted for vertical movement in suitable guideways 180 in the frame 182, so that any vertical adjusting movement of the measuring spindle will be communicated to the jack spindle. The upper pair of screws 170 and 171 are of such pitch that on turning the sleeve 172 an easy and quick adjustment may be obtained. In order to obtain such adjustment there is pivoted upon the frame 182 a gear 184 which may be turned by means of a handle 186 provided with any suitable form of latch. By means of the handle 186 and its gear the operator may initially rotate the sleeve 172 and thereby lift the jack spindle and with it the jack to any desired height with relation to the heel supported in the nail block. Of course the counter clamps 75 should move vertically with the shoe so as to retain the proper relationship and the rearward extension 90 on the spindle 66 as it rises with the spindle carries with it also the vertically moving slide 72 which supports the counter clamps. Thus the jack with its shoe, the counter clamps, and the fore part gages all rise simultaneously when the sleeve 172 is rotated by means of the operating handle 186. This adjustment by means of the handle 186 and its connections is preferably performed before either of the treadles 96 is depressed.

After the shoe has been placed upon the jack and has been clamped and adjusted in position as heretofore described it is raised until it meets and measures the heel, supported by the nail block, by mechanism actuated by either of the treadles 96 turning their respective bell crank levers 94 and 95. To this end a rack 188 (Fig. 11) is mounted in the frame 182 in a position to mesh with the sleeve 176 whereby reciprocation of the rack will rotate the sleeve and will separate the right and left screws 174, 175 to elevate the block 168 and therethrough elevate the jack and its shoe. The rack 188 is moved in a direction to rotate the sleeve 176 so that the jack may be lifted by connection with a lever 190 (Fig. 7) pivoted upon a stud 192 in the lower part of the frame and attached to the rack at its upper end by a yoke and sliding block connection 194. The lever 190 is normally locked in a position with the rack at the rear end of its stroke and with the measuring spindle retracted by means of a latch 196 (Figs. 7 and 8) bearing upon a shoulder on the lever. This latch is normally held in position for locking the lever 190 by means of a coiled spring 198 (Fig. 8) but is tripped for unlocking the lever 190 by means of a trip 200 on a sleeve pinned to the rock shaft 100 which, on movement of the rock shaft, engages a lug 201 on the latch 196 and thereby removes the latch from its engagement with the lever 190. It will be remembered that the rock shaft 100 is rotated upon depression of either of the bell cranks 94 and 95. The angular position of the trip 200 upon the shaft 100 with relation to the movement of the bell cranks, is such that it does not reach a position to unlock the lever 190 until after the shoe has been properly positioned and clamped. Depending from the machine frame is a lever arm 202 extending in the path of movement of the upper arms 122 and 123 of the bell crank levers 94 and 95 such levers being provided with shoes 204 for engaging with a roll 203 carried by the lever 202. The lever 202 is pivotally connected by a link 206 with the measuring mechanism operating lever 190. At about the time that the lever 190 is unlocked, by depression of either of the bell cranks 94 or 95, the shoe 204 on the bell crank which is depressed has reached a position to contact with the depending lever 202, and on further depression of either of the bell cranks 94 or 95 the said lever 202 is moved forward carrying with it the measuring mechanism actuating lever 190 and thereby moving the rack 188 also forward. The sleeve 176 is thus turned in a direction to move the screws 174 and 175 apart to elevate the jack.

A coiled spring 208 is connected to the machine frame and to the measuring mechanism actuating lever 190 and when said lever is locked in its rear position with the jack depressed said spring is under tension. A leaf spring 210 is mounted on the machine base and projects upwardly into a position to bear upon the back of the actuating lever 190 and when said lever is locked in its rear position this spring is also under tension. These two springs therefore aid the bell crank levers 94 and 95 in initially moving the measuring mechanism actuating lever 190 forwardly to do its work, but such springs are by no means strong enough to perform the entire amount of work desired and they are ineffective by themselves to move the rack a sufficient distance to effectively measure the heel. The actual work of actuating the measuring mechanism to perform its function is performed by the operator through sustained pressure upon the treadles of either of the bell cranks 94 or 95. When the jack has been elevated sufficiently for the heel seat of the shoe to meet the heel seat of the heel held in the nail block, the operator ceases to depress the treadle 96 upon which he has been bearing and instantly depresses a treadle 212 (Fig. 1) on one end of a bell crank lever 213 mounted upon a rock shaft 214 in the lower portion of the machine frame. This treadle 212 is in convenient position for the heel of the operator's foot when using the fore part of his foot for one of the treadles 96. It is through this treadle 212 that the clutch is thrown in and the machine is started upon its automatic operations for attaching the heel and spanking on top-lift.

As heretofore mentioned the clutch in the illustrative embodiment of the invention is of the "Horton" type, provided with the usual stop arm 215 (Fig. 16) to which is attached a releasing rod 216 suitably connected for operation by rotation of the rock shaft 214 (Fig. 7). Referring to Fig. 7 it is seen that the upwardly projecting arm of the bell crank carrying the treadle 212 is provided with a pin 217 which enters a slot in the forward end of a link 218, pivotally connected at its rear end to a lug 220 upon the measuring mechanism actuating lever 190. When the lever 190 is locked in its rear position as shown in Fig. 7 the pin 217 is in the forward end of the slot in the link 218. It is therefore impossible to depress the treadle 212 to start the machine so long as the pin and slot remain in this relation. This prevents the accidental starting of the automatic operation of the machine before the shoe has been properly adjusted, and the heel measured. During the movement of the lever 190 in moving the rack 188 to measure the heel, however, the link 218 is moved forward past the pin 217 on the automatic treadle bell crank, until said pin, at the end of the measuring operation, is substantially in the rear of its slot. When the pin and slot are in this relation the treadle 212 may be depressed to throw in the clutch and start the automatic operation of the machine.

As is well known by those skilled in the art in attaching heels it is desirable and customary to compress the heel either before or during the driving of the attaching nails. This is accomplished by a downward movement of the cross head 46 in connection with mechanism to be described. It is desirable that during the compression of the heel the rack 188 of the measuring mechanism should be locked from movement so that the various screws forming the spindle of the measuring mechanism may act as a unitary support to sustain the force of the compression. To this end means is provided for locking said rack prior to the descent of cross head 46 to compress the heel. It is desirable also that the jack slide 62 and the swinging table 60, which has been moved to angularly position the shoe for properly pointing the heel, be locked against movement prior to attaching the heel. It has been found convenient in the illustrative embodiment of the invention to utilize the same means to perform both of these functions.

Referring now to Figs. 1, 10, 11 and 11ª a lever 226 (Fig. 1) is pivoted on the machine frame and extends angularly from front to rear thereof, its rear end being provided with a roll 228 adapted to bear upon a cam 230 (Fig. 16) keyed to a sleeve 231 mounted on a grease bushing upon the driving shaft 34. The sleeve 231 is driven by means of equal gears 232 and 234 upon said sleeve 231 and the counter shaft 38 respectively, so that the sleeve 231 and its cam 230 are driven at the same speed of rotation as the counter shaft 38. A rod 236 depends from the forward end of the lever 226 and is connected to one arm 238 of a bell crank lever on the frame 182 (Fig. 10). The other arm of the bell crank forms a locking device 240 (Figs. 10 and 11ª) extending into recesses in the upper sides of a series of spring pressed pawls 242 and normally holding them in inoperative position out of contact with the teeth of the rack 188. The cam 230 is so designed that just after the clutch 36 is thrown in the forward end of the lever 226 is moved downwardly thereby moving the pawl locking device 240 in a direction to permit said pawls to be thrown by their springs into engagement with the teeth of the rack 188 thereby preventing movement of the rack in either direction. Preferably four pawls are provided spaced apart the distance of five of the teeth on the rack so that a great degree of locking ability is obtained.

Referring now to Fig. 6 the lever 226 is provided with a lug through which extends a vertically arranged rod 246 having at its upper end a plate 248 (Figs. 2 and 4) which extends over a portion of the jack supporting slide 62. A downward movement of the forward end of the lever 226, to operate the locking pawls for the rack 188, also moves the rod 246 downward, brings the locking plate 248 into contact with the jack slide 62, and locks said slide, together with the swinging table 60, from any unintentional movement. The mounting of the rod 246 in the lever 226 is such that excess movement of the lever is taken up by a spring 250 (Fig. 6) on the lower end of the rod. The cam roller 228 is maintained in contact with its cam by means of a spring 252 (Figs. 2 and 6) suitably connected to the machine frame and the lever 226. It is convenient also at this time to latch back the jack slide throwing lever 116 (Fig. 5) in operative position and to this end the extreme forward end 227 (Figs. 2 and 5) of the lever 226 is adapted to engage the crank arm 114 heretofore described as mounted upon the rock shaft 112. As the end 227 of the lever 226 descends the arm 114 is turned downward and at the same time the locking shoulder on the collar 111 is turned to a position for engagement by the latch 110. The movement of the crank arm 114 rocks the shaft 112 thus moving the jack throwing arm 116 into its forward position where it is held by the latch with the spring 120 under tension. The latch on the crank arm 108 is maintained in operative position for engaging its coöperating shoulder by means of a lifting spring 107 (Fig. 1) suitably connected to the actuating rod 106 and the machine frame.

It is obvious that, in the measuring operation, unless the screw 175 (Fig. 10) is held from downward movement the rotation of the sleeve 176 will impart equal but opposite movements to both the screws 174 and 175. If however the screw 175 is held from downward movement the rotation of the sleeve 176 will act to move the upper screw 174 upwardly through twice the distance before obtainable. In order to maintain the screw 175 stationary during the measuring operation the support 260 (Fig. 10) which sustains the screws forming the measuring spindle is normally locked against downward movement during the action of the measuring rack 188. This locking is preferably accomplished by means of a bell crank 262 pivoted upon the depending frame 182 said bell crank having at its lower end a roller 264 engaging at this time beneath a lug 265 upon the measuring spindle support 260. The upper arm of the bell crank 262 is provided with a roller 266 engaging with a cam 268 (Figs. 10 and 16) conveniently formed upon the gear 232. A spring 267 is arranged normally to maintain the roller 266 in contact with its cam. Thus the measuring spindle support 260 is held against downward movement during the measuring operation, when said measuring is performed by actuation of the handle 186 or either of the foot treadles 96.

The downward movement of the cross-head 46, to compress the heel is through a fixed distance determined by the design of the cross-head operating cams 48 and 50. Just prior to the descent of the cross-head the cam 268 operates to move the roller 264 of the bell crank 262 out from beneath the lug 265 of the measuring spindle support 260 so that as the cross-head descends it carries the jack and its supported shoe downward before it by depression of the jack spindle 66, the measuring spindle, and the measuring spindle support. These parts are sustained, when the roller 264 is removed form beneath its lug 265, by means of a strong leaf spring 270 bearing upwardly against the lower end of the measuring spindle support 260. This spring retreats before the downwardly moving parts as the cross-head descends. The amount of compression to be placed upon the heel is determined by an adjusting device carried by the measuring spindle support 260. The lower end of said support is threaded (Fig. 10) and mounted on such threaded portion is a collared sleeve 272 which may be adjusted longitudinally of the support and locked in any desired position by a latch 274. The sleeve 272 moves in a guide 276 rising from the base of the machine frame. If now, the distance between the upper surface of guide 276 and the under surface of the collared sleeve 272 is equal to the vertical movement of the cross-head there will of course be no compression of the heel. If, however, this distance is less than the vertical movement of the cross-head the heel will be compressed an amount equal to the difference between this distance and the movement of the cross-head. Before the machine is started, therefore, the sleeve 272 is adjusted to bring its collar the correct distance from the top of the guide 276 for the amount of compression desired to be placed upon the kind of heel which is to be operated upon. The first operation, then, after the machine is started on its automatic movement by depression of the treadle 212 is to move the cross-head, jack and measuring spindle downward until the collar on the sleeve 272 meets the top of the guide 276 when the shoe will be held against further downward movement and the succeeding downward movement of the cross-head will serve to compress the heel the desired amount.

The heel may be attached to the shoe either during the compression or immediately thereafter. To this end driving devices, the preferable form of which and their actuating mechanism are shown in Figs. 1, 2 and 12 to 15, are put into operation. A cam 280 (Fig. 16) is mounted on the counter shaft 38 and is directly engaged by a cam roll at the lower end of a vertically reciprocating driver actuating rod 282 (Fig. 2) which is screw-threaded at its upper end. Engaging these screw threads is one end of a sleeve 284 which in turn receives the lower end of a rod 286 connected by a universal joint 288 to the outer end of a transversely arranged lever 290 pivoted at 292 in the cross-head 46. The inner end of the lever 290 projects to a position over the nail block 54 and is connected by means of a yoke and slide block device 294 centrally of a plunger 296. The lower end of the plunger 296 is provided with a removable driver block 298 carrying the usual gang of drivers 300.

By preference, the machine is intended to operate upon loaded heels, such, for instance, as produced by the heel loading machine of my co-pending application for United States Patent Serial No. 412727, filed Jan. 27th, 1908, in which the nails have been driven at an angle to the tread face and toward the back of the heel, for a purpose well known to those skilled in the art. Therefore, in the illustrative embodiment of the invention, the plunger 296 which operates the nail drivers is arranged in the cross-head at an angle to the vertical and for movement obliquely in the general direction of the nails in the loaded heel which has been previously placed in position beneath the nail block 54. To this end the pivot 292 of the lever 290 is placed at an angle with the cross-head (see Fig. 15) and the actuating rod 286 is provided with the universal joint heretofore described to permit proper angular movement of the lever 290 with relation to its actuator. The plunger 296 is normally maintained in its elevated position with the drivers 300 at the upper end of their stroke by means of a spring 302 having bearing on the actuator rod 286 and the under side of the cross-head 46. During the downward movement of the cross-head, while it is compressing the heel, the cam roll on the driver actuating rod 282 is traveling upon a dwell on the cam 280 and although the rod 282 is thus held from downward movement there is no actuation of the drivers because the actuator rod 286 is at this time traveling downward in the telescopic joint formed by it with the sleeve 284. This sleeve 284 has been previously adjusted vertically upon its screw and locked in place in such position that the stroke of the cross-head will operate to bring the lower end of the rod 286 just to the bottom of the opening in the sleeve 284. After the heel has been compressed, or during the latter portion of the compression, the cam 280 operates to raise the actuator rod 282 and because of the previous closing of the telescopic joint the rod 286 is also raised and the lever 290 in the cross-head is actuated in a direction to move the drivers quickly downward to drive the nails, which are of such length that they may be clenched in the usual manner upon the inner surface of the heel seat of the shoe. The heel having been attached to the shoe, it is now ready to receive the top-lift. The means for placing a top-lift in position to be spanked on to nails left projecting from the heel is best shown in Figs. 1, 3, 12 and 13. Referring first to Fig. 1 in the illustrative embodiment of the invention the top-lift holding devices are sustained by a supporting carrier 306 which in turn is connected by arms 307 to a transverse rock shaft 308 on the rear side of the cross-head. This transverse rock shaft 308 also has secured to it a crank arm 310 (Figs. 1 and 12) to the outer end of which is pivotally connected a vertically moving rod 312. The lower end of the rod 312 is connected to one arm of a bell crank lever 314 (Fig. 1) pivotally mounted upon a bracket 316 sustained by one of the yokes 49 of the cross-head plungers 44. To the other arm of the bell crank 314 is connected a link 318 in turn connected to one arm of a bell crank 320 pivoted at 322 on the machine frame and carrying on its other arm a roll 324 (Figs. 1 and 10) riding in a groove cam 326 formed in one side of the gear 232 on the sleeve 231. These connections and the proportions of the carrier are such that as the cross-head 46 descends the top-lift carrier rod 312 also descends, thereby, through its connections to the rock shaft 308, turning the top-lift carrier about said rock shaft as a pivot downwardly and toward its operative position just beneath the nail block (see Fig. 2). The construction of the cam groove 326 is such that the movement of the various connecting levers is taken up and the downward movement of the rod 312 is not hindered. The top-lift carrier 306 however only moves partially through its path of movement during the down stroke of the cross-head and upon the up stroke of said cross-head which occurs immediately after the nails are driven the movement of the top-lift carrier is continued until it is finally placed in position beneath the nail block during the dwell of the cross-head at the end of its upward movement. A leaf spring 309 is mounted on the back of the cross-head and is arranged to cushion the final movement of the carrier in reaching its operative position.

In order that the shoe may not follow the cross-head upward the roll 264 of the latch 262 (Fig. 10) is moved inwardly by its cam 268, and over the lug 265 upon the measuring spindle support 260, just prior to the beginning of the upward movement of the cross-head. Thus the spring 270 is prevented from moving the measuring spindle support 260 and the parts carried by it which include the jack, upwardly during the ascent of the cross-head. The frog cams 48 and 50 are so designed that the cross-head ascends on this stroke higher than its initial position to compensate on its return movement, for the added thickness of the top-lift carrier and the top-lift which are now beneath the nail block. The frog cams 48 and 50 and the springs 52 now operate to cause the cross-head 46 to again descend to spank on the top-lift, this downward movement being of substantially the same extent as the original downward movement, which will terminate the stroke of the cross-head in a correct position for properly compressing and attaching the top-lift to the heel.

As top-lifts vary somewhat in thickness it is desirable that means be provided to adjust the top-lift bodily relatively to the heel so that too much pressure will not be applied from the constant stroke of the cross-head. This may be most conveniently done with the top-lift carrier in operative position. In the illustrative embodiment of the invention, referring to Figs. 2 and 13, this adjustment is effected by moving the top-lift holding devices relatively to their support. These holding devices may be of any convenient construction but preferably they are similar in principle to the holding devices described in a co-pending application for United States Patent of W. C. Stewart, Serial No. 409142 filed Jan. 3rd, 1908. These devices are carried by a plate 390 mounted, for movement on suitable guides toward and away from the base plate of the carrier 306. The plate 390 and the carrier base plate are each provided with dovetailed guideways 392 and 394 respectively. Fitting within these guideways is a wedge shaped block 393 which may be moved in and out in the guideways by means of a headed screw 396 held from axial movement on the wedge and threaded into the carrier base plate. By turning the screw 396 the top-lift will be placed in a position nearer to or farther away from the heel without altering its transverse position and the amount of compression for the particular top-lift may be varied without varying the stroke of the cross-head or the position of the shoe.

After the top-lift has been secured to the heel the parts should all be returned to their initial positions, for receiving a new shoe, and it is convenient to automatically move the jack forward from the counter clamps into shoe removing and receiving position.

The preferred form of mechanism used to accomplish these objects will now be described.

Referring now to Figs. 3 and 5 it is seen that on the rock shaft 132, carrying the screw 134 for angularly adjusting the swinging table 60 and also carrying the segments 146 for operating the fore part gage cams 154, there is mounted a block 370 (Fig. 5) which rests within a recess 372 in a bunter carriage 374 mounted for movement in and out of the machine in suitably arranged guides 375 on the support 32. When the jack is in shoe receiving position, as shown in Fig. 5, the block 370 is in a central position with relation to the recess 372. When the rock shaft 132 is rotated to actuate the various positioning devices this block 370 is turned at an angle to its central position and rests against one or the other of the shoulders 373 of said recess. The bunter carriage sustains a spring pressed bunter 376 which is adapted to engage a lug 378 extending downwardly from the jack supporting slide 62. When the jack is in operative position beneath the nailing devices the jack slide 62 has brought its lug 378 to within a short distance of the bunter 376, in practice about three-quarters of an inch. Movement is imparted to the bunter carriage 374 by means of a lever 380 suitably connected with the bunter carriage at its upper end, centrally pivoted on the depending frame 182, and having at its lower end a roll engaging a path cam 382 (Fig. 16) on the sleeve 231 mounted on the driving shaft 34.

When the cross-head 46 begins its upstroke, after the top-lift has been secured to the heel, the lever 226 (Fig. 1) is moved by its cam 230 in a direction to release the locking pawls 242 of the measuring rack 188 so that this rack is now free to be moved. The cam 268 about this time moves the lever 262 (Fig. 10) to a position to unlock the measuring mechanism spindle support 260 so that it may move upward under the influence of the spring 270. About this time, also, a cam 386 (Figs. 7 and 16) on the sleeve 231 supported by the driving shaft 34 reaches a position to engage a roll 388 (Fig. 7) upon a lever 390 pivoted at its upper end on the depending frame 182 and connected at its lower end by a link 392 to the measuring mechanism actuating lever 190. Engagement of the roll 388 by the cam 386 operates to move the lever 190 backward and downward about its pivot 192 thereby withdrawing the rack 188 backward and turning the sleeve 176 in a direction to lower the jack spindle 66 as the cross-head 46 rises. The bunter carriage lever 380 is also moved at this time by its cam to start the bunter carriage forward slightly thereby turning the block 370 either upward or downward which in turn rotates the rock shaft 132 in a direction to withdraw the counter clamps and fore part gage from their engagement with the shoe. The withdrawal of the counter clamps is not accomplished however until after the cross-head has ascended a slight distance away from the top-lift to prevent the upwardly moving head drawing the shoe upward with it by suction on the heel. The rotation of the rock shaft 132 also turns the screw 134 in a direction to move the lever 138 for recentering the swinging table 60. At the time the locking pawls 242 for the measuring rack 188 are released by movement of the lever 226 the clamp 248 for the jack supporting slide 62 is also unclamped so that further forward movement of the bunter 376 will engage the lug 378 on the now entirely free jack supported slide 62 and push it forward from between the heel clamps. As the cross-head rises the top-lift carrier is moved outwardly from beneath the nail block and finally into its top-lift receiving position shown in Fig. 1. This position is not reached however until the cross-head finally comes to rest. Before the cross-head finally comes to rest it moves upward to the height attained by its stroke after the nailing operation and then moves downwardly slightly to its initial position ready to receive the heel. Prior to its final downward movement however the cam 268 operates to move the lever 262 to a position to prevent downward movement of the jack spindle support 260 holding it in readiness for the next measuring operation. The latch 196 (Fig. 7) is automatically thrown into position to lock the actuating lever 190 in its rear position by means of the spring 198 (Fig. 8). The stop arm 214 (Fig. 16) is thrown into position to throw out the clutch at the proper time by the use of the usual operating devices. Before the machine is stopped, however, the bunter carriage 374 is returned to its initial position, as shown in Fig. 5, by means of the cam 382 acting upon its actuating lever 380.

The foregoing description has been in connection with attaching heels to shoes supported upon a wooden last. It is sometimes desirable to remove the last from the shoes and place the shoe upon an iron anvil in the machine, and after the heel has been attached relast the shoes for the trimming and finishing operations. When an iron anvil is used, as is well known by those skilled in the art, it is not necessary to measure the heel as such anvil is strong enough to sustain whatever added pressure may be placed upon the heel due to variations in height. Therefore when the present machine is used for nailing upon an iron anvil, to make the desired disconnection of the measuring devices it is only necessary to remove the jack supporting slide 62 and the jack spindle 66 and put in the machine in place thereof a similar slide to the slide 62 having upon it however an iron anvil with the usual means for adjusting said anvil vertically with relation to its support to obtain the desired amount of compression, such, for instance, as shown in the U. S. Patent to Raymond 354655, dated Dec. 21st, 1886. It may be noted also in this connection that as the variation in the thickness of soles is very slight the counter clamps 75 may be maintained if desired in one invariable vertical position with relation to the top surface of the anvil and to this end the horizontal rearward extension 90 of the spindle of the anvil may be made straight instead of having the cam surface 91 as shown in Fig. 5. The operation of the machine when using an iron anvil is similar in all respects to the operation when using a jack for supporting a shoe upon a wooden last, with the exception of the functions ascribed to the measuring instrumentalities, which in the latter case are inactive.

When the machine is at rest before commencing the series of operations heretofore described, the rolls on the yokes of the plungers 44 are upon a dwell on the frog cams 48 and 50. The cross-head 46 is at the vertical position described somewhat lower than the greatest height to which it is moved and the drivers 300 operating therein are retracted. The driver actuating rod 282 is upon a dwell on its cam 280. The jack slide actuating spring 120 is under tension with the jack at the front of the machine. The swinging table 60 is in its central position and the shoe holding and gaging devices are retracted.

A loaded heel is inserted by the assistant in position beneath the nail block by passing the projecting heads of its nails through the holes in the templet 56 which has been previously selected so that its horseshoe of holes corresponds to the number of nails in the heel to be operated upon. Also a top-lift is placed by the assistant within the holding devices on the carrier 306. A shoe, for the purposes of this description, say a right shoe, is placed in position on the jack. The left treadle 96 is then depressed slightly which releases the jack actuating spring. The treadle at this time is not depressed sufficiently to turn the swinging table about its axis, to bring either of the fore part gages toward the center of the machine, or to permit the counter clamps 75 to close. If not previously attended to, the slide 64 is now adjusted through the hand wheel 340 for the desired pitch of heel, the vertical position of the counter clamps is adjusted through the hand wheel 366, and the relation of the axis of the swinging table 60 to the top-lift is adjusted through the hand lever 330. Adjustment should also be made to position the shoe for the desired pointing of the heel by shifting the fulcrum 140 which governs the angular movement of the table 60 and by varying the path of movement of the fore part gages by turning the hand wheel 354 and thus determining the correct inner position to be assumed for the shoe to be operated upon. The gage proper 88 is also adjusted longitudinally of its arm 86 so that it will rest against the shoe preferably about opposite the end of the tip line on the inner side of the shoe. It should be particularly noted that owing to the angular direction in which the gage arms 86 point, toward the front of the machine, that as the gages 88 are moved longitudinally of said arms for varying sizes of shoes they are simultaneously moved nearer to or farther from the center of the machine and thus accommodate themselves to the varying widths of shoe for varying sizes without the necessity of additional adjustment of the gage arms themselves. Before the foot treadle 96 is further depressed the handle 186 is moved to rotate the gear 184 in the proper direction to place the heel seat of the shoe such a distance below the heel that in measuring the jack spindle 66 is elevated about one inch, the connecting parts being so proportioned that this amount of elevation is obtained through an easy and natural depression of the treadle. Further pressure is now applied to the left treadle 96 and through the connections described the swinging table 60 is turned about its axis in a direction to move the fore part of the shoe to the left, and the left hand fore part gage 88 is moved toward the center of the machine, the operator, as the shoe swings, pressing it toward the left to meet the fore part gage. During the latter part of this final depression of the treadle the counter clamps 75 are closed, the measuring mechanism actuating lever 190 is unlocked and the heel is measured. The treadle 212 is now depressed and the machine is started on its series of automatic operations. As described, in the illustrative embodiment of the invention, four revolutions of the driving shaft 34 are required to reciprocate the cross-head 46 twice to attach a heel and spank on a top-lift. It is obvious that with a one revolution type of clutch, as is preferably used, unless the operator keeps the treadle continuously depressed during the first three revolutions the machine will stop at the completion of each of them.

At the completion of the first revolution of the driving shaft 34 the heel has been attached and the cross-head 46 has been raised through a portion of its succeeding up stroke. During the operation upon the first shoe placed on the machine it is convenient to allow the clutch to stop the machine at this time so that the attached heel may be inspected and, if desirable, adjustment made of some parts of the machine. At the completion of the second revolution of the driving shaft the cross-head has been raised to its highest position and the top-lift carrier 306 has been moved inward and placed in operative position beneath the nail block 54 and its templet 56. It is convenient also to have the machine stop at the end of this revolution so that the proper adjustment of the top-lift relatively to the shoe, may be made. It may be that the operator will want, at this time, also to adjust the shoe positioning devices. To permit such adjustment to be made, the cam 230 which operates the lever 226 is provided with a depression which, at the completion of the second revolution, permits the lever to move in a direction to release the jack slide locking plate 248. The movement of the lever 226 is not sufficient, however, to retract the locking pawls 242 of the measuring rack 188, the locking device 240 having sufficient loose play in the recesses of the pawls to prevent this. Thus any of the original adjustments can be altered and without re-measuring the heel. The top-lift is spanked on during the third revolution of the driving shaft 34 and as this completes the operations upon the shoe there is no necessity of further stoppage of the machine until the parts have assumed their initial positions in readiness to receive a new shoe at the end of the fourth revolution. It is therefore desirable that a latching mechanism for the clutch stop arm 215 be provided to prevent stoppage of the machine, before the completion of the fourth revolution should the operator remove his foot from the treadle 212 during the period of the third revolution. To this end the counter shaft 38 is provided at its end (Fig. 16) with a tappet cam 398 which, during the period of the third revolution, bears upon a lever 400 so connected to the stop arm 215 of the clutch that when depressed the stop arm is prevented from moving to a position to throw out the clutch. The lever 400 is unlocked again at the beginning of the fourth revolution. It is during the third revolution of the driving shaft 34 that the bunter carriage 374 moves forward, thereby unlocking the counter clamps and automatically moving the jack forward into shoe removing and receiving position. The time of the fourth revolution is consumed in placing the cross-head and the top-lift carriers in their initial positions and this time is also taken by the operator and his assistant to place a new shoe on the jack, a new top-lift in its carrier and thereafter a new heel in the nail block.

Nothing herein contained is to be construed as limiting this invention in the scope of its application to use in connection with the particular machine or the particular mode of operation, or both, selected for purposes of illustration and explanation. While the particulars of construction herein set forth are well suited to one form of the invention, it is not to be understood that these particulars are essential since they may be variously modified within the skill of the artisan without departing from the true scope of the actual invention as defined in the following claims.

What is claimed as new, is:—

1. In a machine of the class described, the combination with a shoe support to swing the shoe laterally into a fixed position for treatment and means for oscillating said support, of a stop against which the forepart of the shoe contacts to define its lateral position as the shoe support is swung laterally.

2. In a machine of the class described, the combination with a shoe support, of means to adjust the shoe for a selected pointing of the heel including a side gage disposed on each side of said support normally in inoperative position, and mechanical means for selectively moving said gages into operative position.

3. In a machine of the class described, the combination with a shoe support, of means for angularly positioning both right and left shoes including forepart gages on opposite sides of said shoe support, and provision for alternatively operating said gages to determine the swing for rights and lefts.

4. In a machine of the class described, the combination with a shoe support, of counter clamps, two forepart gages normally in inoperative position, and means for moving said gages into operative position singly.

5. In a machine of the class described, the combination with an angularly movable shoe support and a forepart gage for contacting with the shoe, of means for angularly moving said shoe support and for placing said gage in a predetermined relation to said support to be met by the shoe when the latter is swung into the desired position.

6. In a machine of the class described, the combination with a swinging shoe support, of a movable carriage on which said support is sustained, a stop for engaging the shoe, and means for simultaneously moving the carriage and shoe in one direction and the stop in an opposite direction.

7. In a machine of the class described, the combination with an angularly movable shoe support and a positioning stop for the shoe both normally out of operating position, of means for moving said parts into a predetermined operating position, and separate means for returning them to their initial position.

8. In a machine of the class described, the combination with an angularly movable shoe support, a forepart gage and counter clamps, of common actuating means for positioning the support and gage and clamping the shoe within the counter clamps.

9. In a machine of the class described, the combination with a work support, of an arm extending forward on each side of said support and normally remote therefrom each arm being provided with a stop face or gage, devices engaging each of said arms and operative to move them inward toward the shoe, and means for actuating said devices simultaneously, said devices and actuating means being constructed and arranged to move but one arm inward at a time.

10. In a machine of the class described, the combination with a work support, of a forepart gage movable toward and from said support, actuating devices for said gage, and means for varying the path of movement of said gage under the action of said devices.

11. In a machine of the class described, the combination with a work support, of a gage arm extending longitudinally adjacent said support, means for swinging said gage arm into and out of operative position with respect to a shoe on said support, and a gage adjustably mounted on said arm to vary its position longitudinally thereof and cause it to act at a desired point in front of the heel of the shoe.

12. In a machine of the class described, the combination with a work support, of an oscillatory carriage sustaining said support, and treadle operated means for oscillating said carriage, said means being adjustable to vary the angle of oscillation.

13. In a machine of the class described, the combination with an angularly movable work support, normally in central position, of means under control of the operator for initially moving said support angularly, and automatic means for returning said support to central position.

14. In a machine of the class described, the combination with vertically movable counter clamps and a shoe support movable to place the shoe therebetween, of means affording provision for an upward movement of said clamps before the shoe reaches a position between them.

15. In a machine of the class described, the combination with vertically movable counter clamps and a horizontally movable shoe support, of means controlled by the support for determining the movement of the clamps vertically.

16. In a machine of the class described, the combination with a shoe support, of counter clamps, means operative for moving said clamps vertically relatively to the shoe as the latter is moved into operative relation with respect to the counter-clamps, and provision for varying the path of such movement.

17. In a machine of the class described, the combination with a shoe support and counter clamps, of provision for moving said clamps vertically relatively to the sole of the shoe as the latter is moved toward the counter-clamps.

18. In a machine of the class described, the combination with a work support mounted for angular movement, a forepart gage to engage the work as it is moved angularly with the work support, of provision for varying the alinement of said work support and the axis about which the work support has movement.

19. In a machine of the class described, the combination of an angularly movable carriage, shoe supporting means sustained by said carriage, a support for said carriage whereon it has its angular movement, provision for moving said carriage support transversely, and side gages separately movable into position to contact with the shoe and determine its lateral swing.

20. In a machine of the class described, counter clamps, and means to close said clamps comprising a pivot pin for each clamp, crossed levers extending inwardly from said pins, a bearing block on the upper sides of said levers, and means for exerting pressure on said block.

21. In a machine of the class described, the combination with a sliding work support movable into and out of operative position, of a locking device for said support, and mechanically actuated means for automatically operating said device to lock the sliding work support as it reaches operative position and to automatically unlock said support when it is to be moved from operative position.

22. In a machine of the class described, the combination with a work support normally out of operative position and movable by the operator into operative position, of mechanical means for initially starting the movement of the support to operative position.

23. In a machine of the class described, the combination with a work support normally in inoperative position and movable by the operator into operative position, of shoe positioning means, and spring actuated means for aiding the operator in placing the shoe in operative position in engagement with said positioning means.

24. In a machine of the class described, a heel measuring mechanism including a measuring spindle comprising right and left-hand screws held from rotation, a sleeve threaded on said screws, means to hold one of said screws from axial movement, and means to rotate said sleeve.

25. In a machine of the class described, a heel measuring mechanism including a screw threaded measuring spindle held from rotation, a pinion on said spindle, a reciprocatory actuator engaging said pinion, and means to lock said actuator against movement in either direction upon completion of the measuring operation.

26. In a machine of the class described, a heel measuring mechanism including a screw threaded measuring spindle held from rotation, a pinion on said spindle, a rack engaging said pinion, means for reciprocating said rack, a locking pawl, and means to move said pawl between the teeth of the rack.

27. In a machine of the class described, a shoe support movable into and out of operative position, a heel measuring mechanism, locking devices for said parts, and a common actuator for said locking devices.

28. In a machine of the class described, a shoe support movable into and out of operative position, a heel measuring mechanism, separate locking devices for said parts, and common means for operating said locking devices, said means being constructed to permit release of one of said locking devices while maintaining the other in locking position.

29. In a machine of the class described, a shoe support, shoe gaging devices for angularly positioning the shoe on said support, counter clamps for clamping the shoe on said support, and a common actuator for said devices and counter clamps.

30. In a machine of the class described, shoe positioning devices, a heel measuring mechanism, separate trains of mechanism for operating the positioning devices and measuring mechanism, and a common actuator for said trains of operating mechanism.

31. In a machine of the class described, shoe positioning devices, a heel measuring mechanism, separate trains of mechanism for operating the positioning devices and measuring mechanism, a common actuator for said trains of operating mechanism, and provision for delaying action of the measuring mechanism until the shoe has been positioned.

32. In a boot and shoe machine, the combination of a work support movable into and out of operative position, counter clamps movable to engage a shoe on the work support when moved to operative position, and means to initially start the work support toward operative position and to thereafter move the counter clamps into engagement with the shoe.

33. In a boot and shoe machine, the combination of a work support movable into and out of operative position, counter clamps movable to engage a shoe on the work support when moved to operative position, and treadle controlled means to initially start the work support toward operative position and to thereafter move the counter clamps into engagement with the shoe.

34. In a boot and shoe machine, the combination of a work support movable into and out of operative position, counter clamps movable to engage a shoe on the work support when in operative position, gages to determine the swing of the shoe, means to initially move the work support toward the counter clamps, and means to thereafter move the gages and counter clamps into operative position.

35. In a boot and shoe machine, the combination of a work support, a swinging carriage sustaining said support, gages to contact with the shoe to determine its swing, counter clamps to engage the shoe, and treadle means acting to swing the carriage, position the gages, and move the counter clamps.

36. In a boot and shoe machine, the combination of a work support, a swinging carriage sustaining said support, gages to contact with the shoe to determine its swing, counter clamps to engage the shoe, right and left treadles, and means operative by either of said treadles to swing the shoe support laterally, position the gages, and move the counter clamps into engagement with the shoe.

37. In a boot and shoe machine, the combination of a shoe support, means for swinging said support laterally to the right or left, a right and left treadle for so swinging said support, and a stop against which the forepart of the shoe contacts as it is moved.

38. In a boot and shoe machine, the combination of a fixed support, a sliding table movable longitudinally on said support, a swinging table on said sliding table, a jack slide on the swinging table, a second slide on said swinging table, and counter clamps and side gages carried by said second slide.

39. In a boot and shoe machine, the combination of a fixed support, a sliding table movable longitudinally on said support, a swinging table on said sliding table, a jack slide on the swinging table, a second slide on said swinging table, counter clamps carried by said second slide, means for moving the counter clamps upward, and a stop for limiting the upward movement of said clamps.

40. In a boot and shoe machine, the combination of a work support, counter clamps for engaging the work on said support, a spring for raising the counter clamps into proper clamping position, and a stop connected to the work support for determining the extent of such movement of the counter clamps.

41. In a boot and shoe machine, the combination of a work support, side gages to contact with the shoe, means to swing the work support and side gages laterally in positioning a shoe, mechanism acting through said means to return the work support and side gages to initial position, and actuating means for said mechanism.

42. In a boot and shoe machine, the combination of a work support, side gages to contact with the shoe, means actuated by the operative for swinging said work support and side gages laterally, and power operated means for returning them to initial position.

43. In a boot and shoe machine, the combination of a swinging work support, a side gage to be engaged by the forepart of a shoe on said support, counter clamps, means actuated by the operative to swing the shoe support and side gage and to close the counter clamps, and power operated means for returning the parts to initial position.

44. In a boot and shoe machine, the combination of a laterally swinging shoe support, laterally movable side gages and counter clamps, a shaft, connections between said shaft and said shoe support, side gages and counter clamps for moving said parts in the manner stated, and treadle means for turning said shaft in positioning the swinging shoe support, side gages and counter clamps.

45. In a boot and shoe machine, the combination of a laterally swinging shoe support, laterally movable side gages and counter clamps, a shaft, connections between said shaft and said shoe support, side gages and counter clamps for moving said parts in the manner stated, treadle means for turning said shaft in positioning the swinging shoe support, side gages and counter clamps, and power means for turning said shaft to initial position.

46. In a boot and shoe machine, the combination of a laterally swinging shoe support, laterally movable side gages and counter clamps, a shaft, connections between said shaft and said shoe support, side gages and counter clamps for moving said parts in the manner stated, treadle means for turning said shaft in positioning the swinging shoe support, side gages and counter clamps, a slide 374, and means on the shaft co-acting with said slide to turn the shaft to initial position.

47. In a boot and shoe machine, the combination of a swinging shoe support, counter clamps and side gages, means for moving said counter clamps and side gages in a plane substantially at right angles to the sole of a shoe on said support, and a stop controlled by the work support for limiting such movement of the counter clamps and side gages.

48. In a boot and shoe machine, the combination of a fixed support, a sliding table movable with relation to said support, a swinging table on said sliding table, treadle means for swinging said swinging table, a jack carried by the swinging table, and means for adjusting the axis of swing of said swinging table.

49. In a boot and shoe machine, the combination of a fixed support, a sliding table movable thereon, a swinging table on said sliding table, a jack carried by the swinging table, a back stop carrying slide on said swinging table, means for adjusting the axis of swing of the swinging table, and means for moving the back stop carrying slide on said swinging table.

50. In a boot and shoe machine, the combination of a fixed support, a sliding table movable with relation thereto and carrying a swinging table, a jack and back stop carried by the swinging table, means for moving the sliding table and the parts thereon to change the center of the axis of swing of the swinging table, and means for locking the sliding table in its adjusted position.

51. In a boot and shoe machine, the combination of a fixed support, a sliding table movable with relation thereto and carrying a swinging table, a jack and back stop carried by the swinging table, means for moving the sliding table and the parts thereon to change the center of the axis of swing of the swinging table, and means for locking the sliding table in its adjusted position, said means including a pin 336 and perforated projection 334.

52. In a boot and shoe machine, the combination of a work support, measuring means for moving said support including a two part spindle having right and left screw threads and held from rotative movement, a sleeve having right and left threads for engaging the corresponding threads of the two part spindle, and means for rotating the sleeve.

53. In a boot and shoe machine, the combination of a work support, measuring means for moving said support including a two part spindle having right and left screw threads and held from rotative movement, a sleeve having right and left threads for engaging the corresponding threads of the two part spindle, means for rotating the sleeve, and means for locking the sleeve.

54. In a boot and shoe machine, the combination of a work support, measuring means for moving said support including a two part spindle having right and left screw threads and held from rotative movement, a sleeve having right and left threads for engaging the corresponding threads of the two part spindle, a rack for turning said sleeve, a lock for holding the rack, and power operated means to trip the lock.

55. In a boot and shoe machine, the combination of a work support, measuring means for moving said support including a two part spindle having right and left screw threads and held from rotative movement, a sleeve having right and left threads for engaging the corresponding threads of the two part spindle, a rack for turning said sleeve, a rack actuator, a lock for holding the actuator with the work support in lowered position, and means for tripping the lock and then moving the actuator.

56. In a boot and shoe machine, a work support, hand operated measuring means for moving said support including right and left screw threaded spindle portions, a sleeve correspondingly threaded interiorly and engaging said spindle portions, and a hand operated wheel for engaging and turning said sleeve.

57. In a boot and shoe machine, the combination of a work support, a spring 270 for raising said work support, a lock 264 for holding the work support raised, a plural part spindle between the work support and spring, right and left screw threads on adjoining parts of said spindle, an interiorly right and left screw threaded sleeve engaging said parts of the spindle, and means for rotating the sleeve to impart to the work support quick upward movement.

58. In a boot and shoe machine, the combination of a work support and counter clamps, means for swinging the work support to position a shoe laterally and for closing the clamps, a bunter carriage, and means for moving said carriage to cause the counter clamps to move from the shoe and thereafter to cause the shoe support to move out of operative position.

59. In a boot and shoe machine the combination of a work support and counter clamps, means for swinging the work support to position a shoe laterally and for closing the clamps, a bunter carriage, and means for moving said carriage to cause the counter clamps to move from the shoe and thereafter to cause the shoe support to move out of operative position and depress the counter clamps.

60. In a boot and shoe machine, the combination of a work support, side gages to engage the shoe on said support and counter clamps, means for swinging the shoe support and a side gage laterally to position a shoe and to cause the counter clamps to engage the shoe, a bunter carriage, and means for moving said carriage to return the work support, side gage and counter clamps to original position.

61. In a boot and shoe machine, the combination of a work support, an extensible spindle sustaining said support, means to raise said spindle as a whole, means to extend the spindle, and a lock for holding the work support and spindle as a whole in lowered position against the action of said means.

62. In a boot and shoe machine, the combination of a work support, measuring means including a spindle for said support, a lock for holding said spindle from downward movement during the operation of the measuring means, and means for automatically unlocking the spindle.

63. In a boot and shoe machine, the combination of a shoe support, a swinging table therefor, side gages adapted to be moved to contact with and position a shoe on said support, counter clamps, means for swinging the table and gages and for closing the counter clamps, measuring means for the shoe support, and a treadle for operating said means to position the shoe and thereafter the measuring means when the shoe is in desired lateral position.

In testimony whereof, I have signed my name to this specification, in the presence of two subscribing witnesses.

THOMAS G. PLANT.

Witnesses:
IRVING U. TOWNSEND,
AMELIA M. ROSS.